US008099096B2

(12) United States Patent
Prakash et al.

(10) Patent No.: US 8,099,096 B2
(45) Date of Patent: Jan. 17, 2012

(54) METHOD AND APPARATUS FOR MANAGING A SET OF COMMUNICATIONS CONNECTION RELATED INFORMATION

(75) Inventors: Rajat Prakash, San Diego, CA (US); Fatih Ulupinar, San Diego, CA (US); Gavin Horn, La Jolla, CA (US); Paul E. Bender, San Diego, CA (US); Parag Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1153 days.

(21) Appl. No.: 11/759,922

(22) Filed: Jun. 7, 2007

(65) Prior Publication Data
US 2007/0286112 A1 Dec. 13, 2007

Related U.S. Application Data

(60) Provisional application No. 60/811,877, filed on Jun. 7, 2006.

(51) Int. Cl.
*H04M 3/00* (2006.01)
*H04W 4/00* (2009.01)
*H04W 36/00* (2009.01)

(52) U.S. Cl. ............ 455/437; 455/418; 455/422.1; 455/434; 455/436; 370/331

(58) Field of Classification Search ......... 455/418–420, 455/422.1, 432.1–432.3, 434, 436–451, 452.1–452.2, 455/466, 509, 512–517, 522, 524–526, 550.1, 455/556.2, 561, 562.1; 370/319–321, 328–329, 370/331–350, 315
See application file for complete search history.

(56) References Cited

U.S. PATENT DOCUMENTS

| | | | | |
|---|---|---|---|---|
| 5,946,621 | A * | 8/1999 | Chheda et al. | 455/440 |
| 6,073,021 | A * | 6/2000 | Kumar et al. | 455/442 |
| 6,731,936 | B2 | 5/2004 | Chen et al. | |
| 7,042,858 | B1 * | 5/2006 | Ma et al. | 370/331 |
| 7,126,928 | B2 | 10/2006 | Tiedemann et al. | |
| 7,133,682 | B2 * | 11/2006 | Seki et al. | 455/450 |

(Continued)

FOREIGN PATENT DOCUMENTS

JP 2005510988 T 4/2005
(Continued)

OTHER PUBLICATIONS

International Search Report—PCT/US07/070657, International Search Authority—European Patent Office—Nov. 7, 2007.
(Continued)

*Primary Examiner* — Meless Zewdu
(74) *Attorney, Agent, or Firm* — Darren M. Simon; Milan Patel

(57) ABSTRACT

Methods and apparatus related to management of active connections between an access terminal and access points are described. An access terminal maintains and manages active set information. The active set information identifies a set of access points with which the access terminal has an active connection. In some embodiments, the active set information includes allocated resources assigned to the access terminal corresponding to the different access points in the active set. Layer 2 Transport Tunneling is used, in various embodiments, to communicate connection request and/or connection response information, between access points. In some embodiments, the access terminal optionally assists in coordinating MAC resources allocated to the access terminal by different access points.

40 Claims, 12 Drawing Sheets

U.S. PATENT DOCUMENTS

| | | |
|---|---|---|
| 7,139,274 B2 | 11/2006 | Attar et al. |
| 7,680,496 B2 * | 3/2010 | Wakabayashi ............... 455/434 |
| 2002/0045451 A1 * | 4/2002 | Hwang et al. ................ 455/442 |
| 2005/0073990 A1 | 4/2005 | Chang et al. |
| 2006/0172738 A1 * | 8/2006 | Kwon et al. .................. 455/439 |
| 2006/0223535 A1 * | 10/2006 | Das et al. ...................... 455/436 |
| 2007/0254658 A1 * | 11/2007 | Fabien et al. ................. 455/436 |

FOREIGN PATENT DOCUMENTS

| | | |
|---|---|---|
| JP | 2007508743 T | 4/2007 |
| KR | 20030084811 | 11/2003 |
| KR | 1020040027971 | 4/2004 |
| KR | 1020050026684 | 3/2005 |
| KR | 1020060056984 | 5/2006 |
| RU | 2150176 | 5/2000 |
| WO | WO2004079948 A1 | 9/2004 |
| WO | WO2005015941 | 2/2005 |
| WO | WO2005086380 A1 | 9/2005 |
| WO | WO2005104402 | 11/2005 |

OTHER PUBLICATIONS

Written Opinion—PCT/US2007/070657, International Search Authority, European Patent Office, Jul. 11, 2007.

* cited by examiner

METHOD AND APPARATUS FOR MANAGING A SET OF COMMUNICATIONS CONNECTION RELATED INFORMATION

RELATED APPLICATIONS

The present application claims the benefit of U.S. Provisional Patent Application Ser. No. 60/811,877 filed on Jun. 7, 2006, titled "A METHOD AND APPARATUS FOR MANAGING AN ACTIVE SET" which is hereby expressly incorporated by reference.

FIELD

The present invention is directed to methods and apparatus for wireless communications, and more particularly to methods and apparatus related to active set management for an access terminal.

BACKGROUND

Consider a Mobile Wireless Communication System with multiple access points (AP) that provide service to access terminals (AT). Many systems have an active set, which is a set of APs that have assigned resources to the AT. In most wireless systems (CDMA2000, GSMWWCDMA etc.) this Active Set is determined at the network, on the basis of signal strengths received by the AT from individual APs (the AT reports the signal strength in a Pilot Strength Measurement Message (PSMM)). This determination of the Active Set by the network has the following problems 1. Need for an Active Set Control protocol to operate between APs for the coordination of the Active Set. This increases the complexity of the inter-AP interactions, particularly when additions to the active set also involve coordination of MAC/PHY parameters across the active set (such as control channel configuration etc.)
2. As the AT moves through the system, the state of the Active Set Control protocol has to be transferred between Controllers. This increases the complexity of handoff, and depending on the design, may create a time interval when the Active Set Control protocol may have to be frozen.

A current state of the art Call Flow will now be described with respect to drawing 500 of FIG. 1. Drawing 500 includes an access terminal 502, a first access point, APa 504, a second access point, APb 506, and an anchor AP 508.

Consider the case when APa 504 is the currently serving AP and the AT 502 wishes to add APb 506 to the Active Set (say after measuring strong signal strength from APb 506). In this example, pilot signal 510 transmitted from APb 506 is detected and measured by AT 502 and AT 502 measures a strong signal strength as indicated by block 512.

1. AT 502 sends a PilotReport 514 containing the signal strength from different pilots.
2. APa 504 receives this pilot report 514 and forwards the message to the AnchorAP 508 as indicated by signal 516. The AnchorAP 508 parses the message and decides to add APb 506 to the Active Set as indicated by block 518. If APa 504 and APb 506 use different versions of the messages (or protocols) the AnchorAP 508 is able to parse message formats for both versions.
3. AnchorAP 508 sends ActiveSetAddRequest to APb 506, along with a list of other resources being used by the AT as indicated by signal 520.
4. APb 506 assigns a new MAC ID (or connection ID) to the AT 502 and creates resources for the AT corresponding to the resources suggested by the IAP in step 3 as indicated by block 522. APb 506 communicates MAC ID to Anchor AP 508 as indicated by signal 524.
5. Optionally, depending on information exchange with APb 506, AnchorAP 508 may change the resources assigned to the AT 502 by APa 504. For example, Anchor AP 508 sends a Resource Update Request message 526 to APa 504 and receives a Resource Update Response message 528.
6. AnchorAP 508 creates an ActiveSetAssignment message 530 and sends to the AT 502 via APa 504. Active Set Assignment message 532 is communicated from APa 504 to AT 502. The Active Set Assignment (530, 532) contains updated resources from APb 506. At some times, the Active Set Assignment (530, 532) contains updated resources on APa 504. Block 534 indicates that AT 502 adds APb 506 to the active set.

It should be appreciated that improved methods and apparatus relating to the management of active connections between an access terminal and access points are desirable. For example, improved methods for establishing connections, updating connection information and/or storing information about which APs are being used by an access terminal at a given point in time would be desirable in at least in some but not necessarily all systems.

SUMMARY

A method in accordance with various embodiments provides a method for an access terminal (AT) to manage a set of APs and/or information about connections with APs that have assigned resources to the AT without the need for an Active Set Control Protocol operating between Access Points (APs). Methods and apparatus related to management of active connections between an access terminal and access points are described. An access terminal maintains and manages active set information. In various embodiments, the access terminal is the single point in the communications system used for the collection and storage of access terminal's active set information. The active set information identifies a set of access points with which the access terminal has an active connection. In some embodiments, the active set information includes allocated resources assigned to the access terminal corresponding to the different access points in the active set. Layer 2 Transport Tunneling is used, in various embodiments, to communicate connection request and/or connection response information, between access points.

An exemplary method of operating an access terminal in a network includes transmitting a connection request to a first access point with which said access terminal has a connection, said connection request indicating that said access terminal seeks to establish an active connection with a second access point. The exemplary method further comprises receiving a connection response message from said first access point and updating, based on the received connection response message, a set of information indicating access points with which said access terminal has an active connection. An exemplary access terminal for use in a communications network includes: a wireless transmitter module for transmitting a connection request to a first access point with which said access terminal has a connection, said connection request indicating that said access terminal seeks to establish an active connection with a second access point. The exemplary access terminal further comprises: a wireless receiver module for receiving a connection response message from said first access point; memory including a set of information indicating access points with which said access terminal has an active connection; and a connection management module for updating, based on the received connection response message, said set of information indicating access points with which said access terminal has an active connection.

An exemplary method of operating a first access point includes receiving a connection request from an access terminal with which said first access point has an active connection, said connection request including an identifier corresponding to a second access point with which said access terminal is seeking to establish an active connection. The exemplary method of operating a first access point further comprises:

forwarding at least a portion of the connection request to said second access point; receiving from the second access point a connection response message; and forwarding the connection response message to said access terminal. An exemplary first access point includes a wireless receiver module for receiving a connection request from an access terminal with which said first access point has an active connection, said connection request including an identifier corresponding to a second access point with which said access terminal is seeking to establish an active connection. The exemplary first access point further comprises: a connection request forwarding module for forwarding at least a portion of the connection request to said second access point; a network interface module for receiving from the second access point a connection response message; and a connection response forwarding module for forwarding the connection response message to said access terminal.

An exemplary method of operating a second access point, having a connection with a first access point which has an active connection with an access terminal, comprises: receiving a connection request communicated from the first access point to the second access point indicating that said access terminal is seeking to establish a connection with said second access point; generating a connection response message; and communicating the connection response to said first access point for forwarding to said access terminal. An exemplary second access point, having a connection with a first access point which has an active connection with an access terminal, comprises: an I/O interface module for receiving a connection request communicated from the first access point to the second access point indicating that said access terminal is seeking to establish a connection with said second access point; a connection response generation module for generating a connection response message; and wherein said I/O interface module also communicates the connection response to said first access point for forwarding to said access terminal.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 5 illustrates an exemplary network including a centralized AN architecture and an AT.

DETAILED DESCRIPTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (IX) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Figure 1:
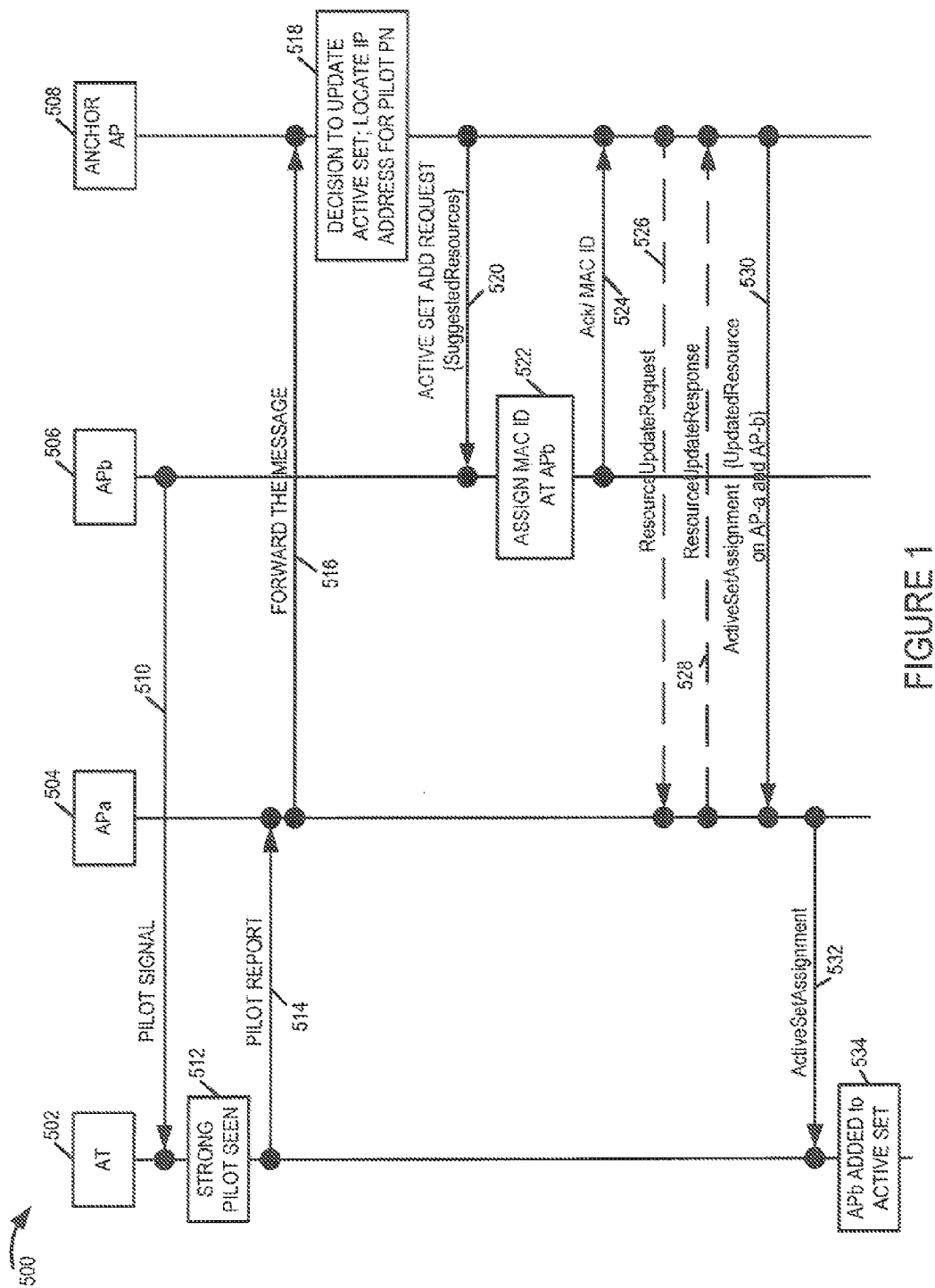
FIG. 1 illustrates exemplary current state of the art call flow in a communications network including an access terminal and a plurality of access points.
Figure 2:
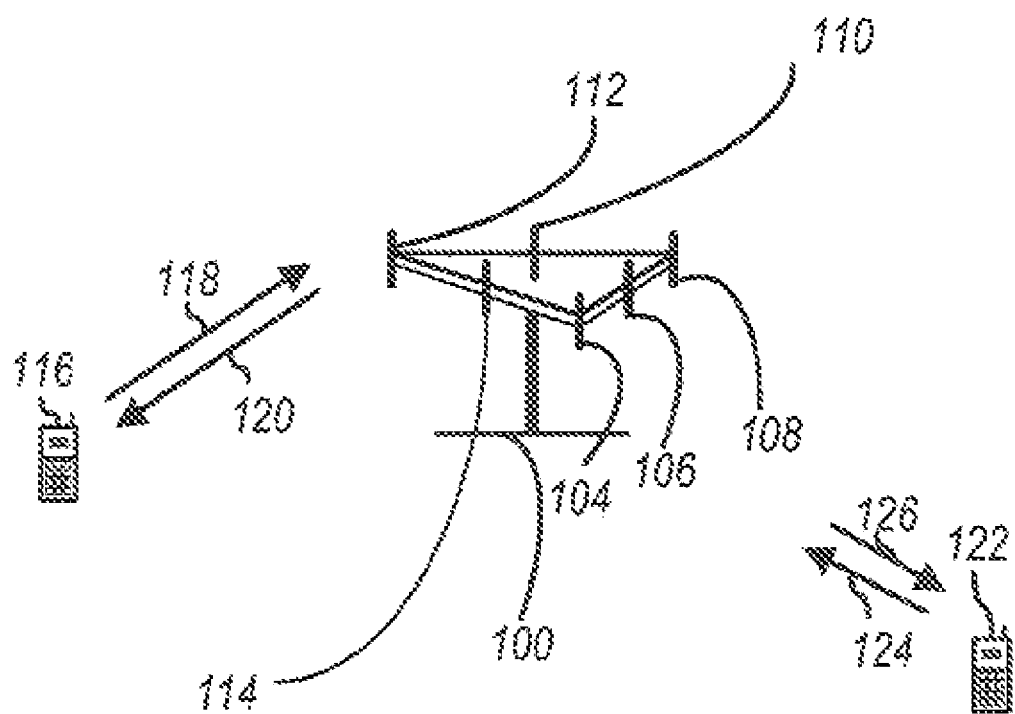
FIG. 2 illustrates a multiple access wireless communication system according to one embodiment.

Referring to FIG. 2, a multiple access wireless communication system according to one embodiment is illustrated. An access point 100 (AP) includes multiple antenna groups, one including 104 and 106, another including 108 and 110, and an additional including 112 and 114. In FIG. 2, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a Node B, a base station or some other terminology. An access terminal may also be called an access device, user equipment (UE), a wireless communication device, terminal, wireless terminal, mobile terminal, mobile node, end node or some other terminology.

Figure 3:
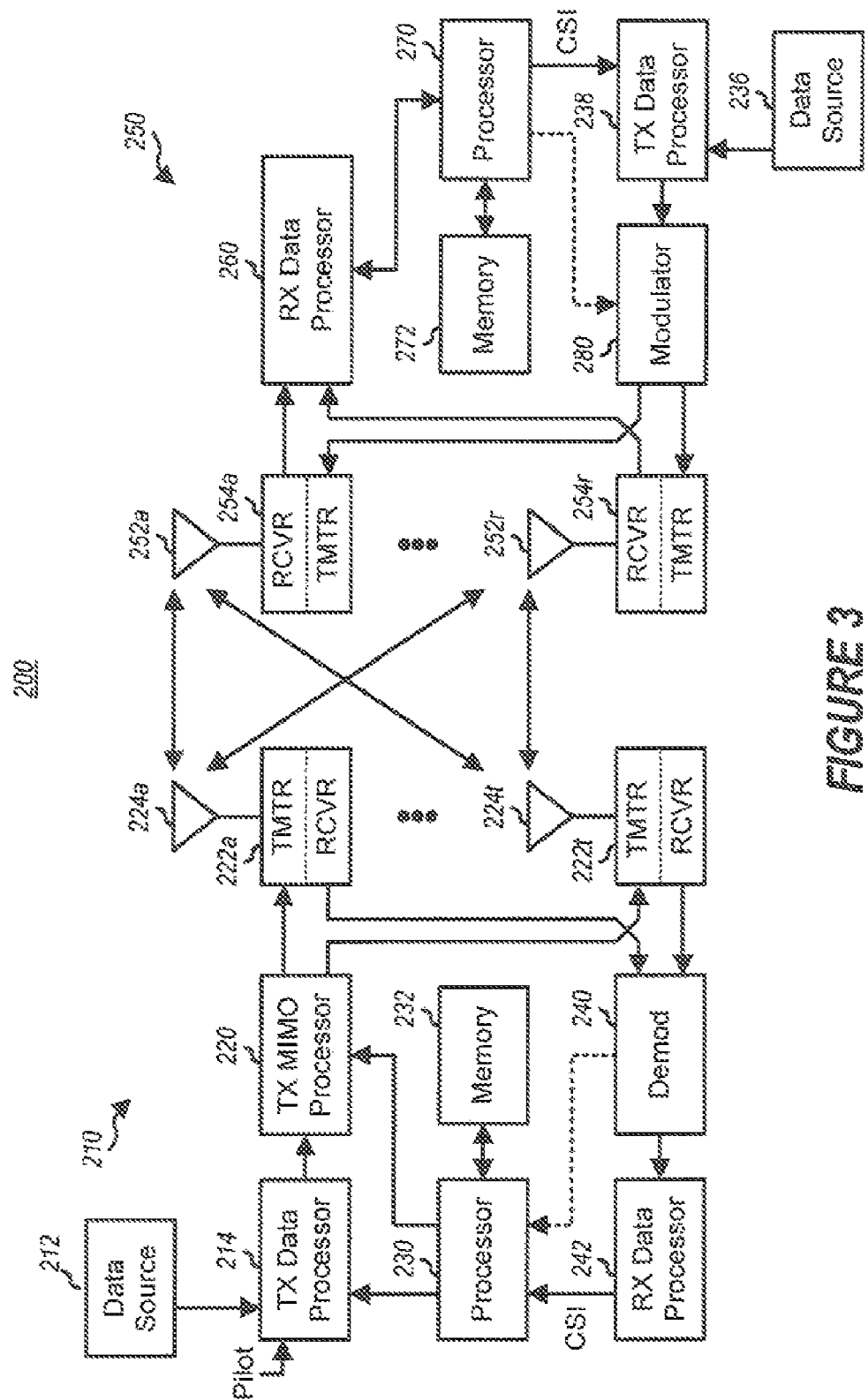
FIG. 3 a block diagram of an exemplary communication system.

FIG. 3 is a block diagram of an embodiment of an exemplary access point 210 and an exemplary access terminal 250 in a MIMO system 200. At the access point 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter (222a, . . . , 222t) receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver (254a, . . . , 254r) conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers (254a, . . . , 254r) based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted, via antennas (252a, 252r), respectively, back to access point 210.

At access point 210, the modulated signals from access terminal 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Memory 232 includes routines and data/information. Processors 230, 220 and/or 242 execute the routines and uses the data/information in memory 232 to control the operation of the access point 210 and implement methods. Memory 272 includes routines and data/information. Processors 270, 260, and/or 238 execute the routines and uses the data/information in memory 272 to control the operation of the access terminal 250 and implement methods.

In an aspect, SimpleRAN is designed to significantly simplify the communications protocols between the backhaul access network elements in a wireless radio access network, while providing fast handoff to accommodate the demands of low latency applications, such as VOIP, in fast changing radio conditions.

In an aspect, the network comprises access terminals (AT) and an access network (AN).

The AN supports both a centralized and distributed deployment. The network architectures for the centralized and distributed deployments are shown in FIG. 4 and FIG. 5 respectively.

Figure 4:
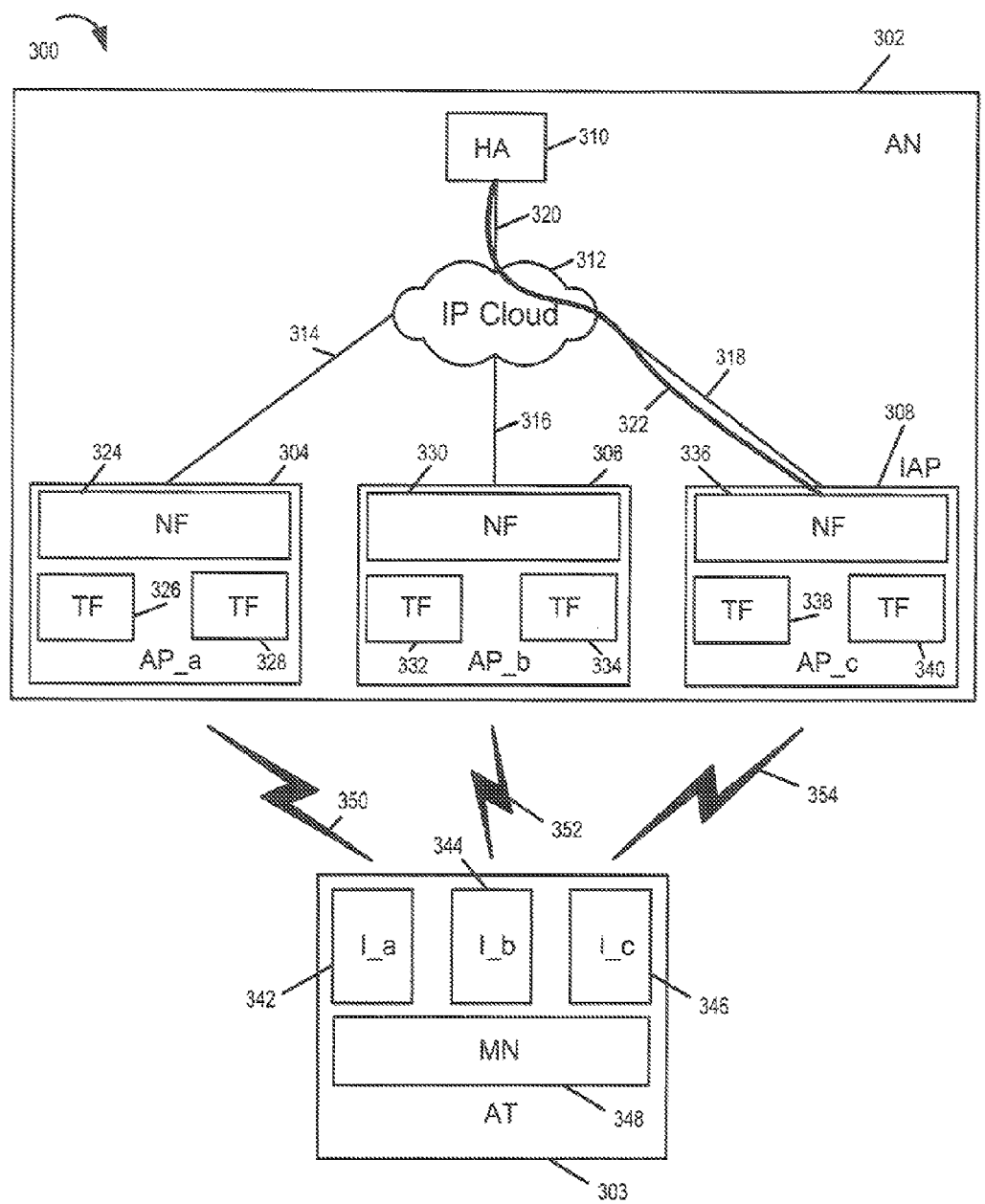
FIG. 4 illustrates an exemplary network including a distributed access network (AN) architecture and an access terminal (AT).
Figure 5:
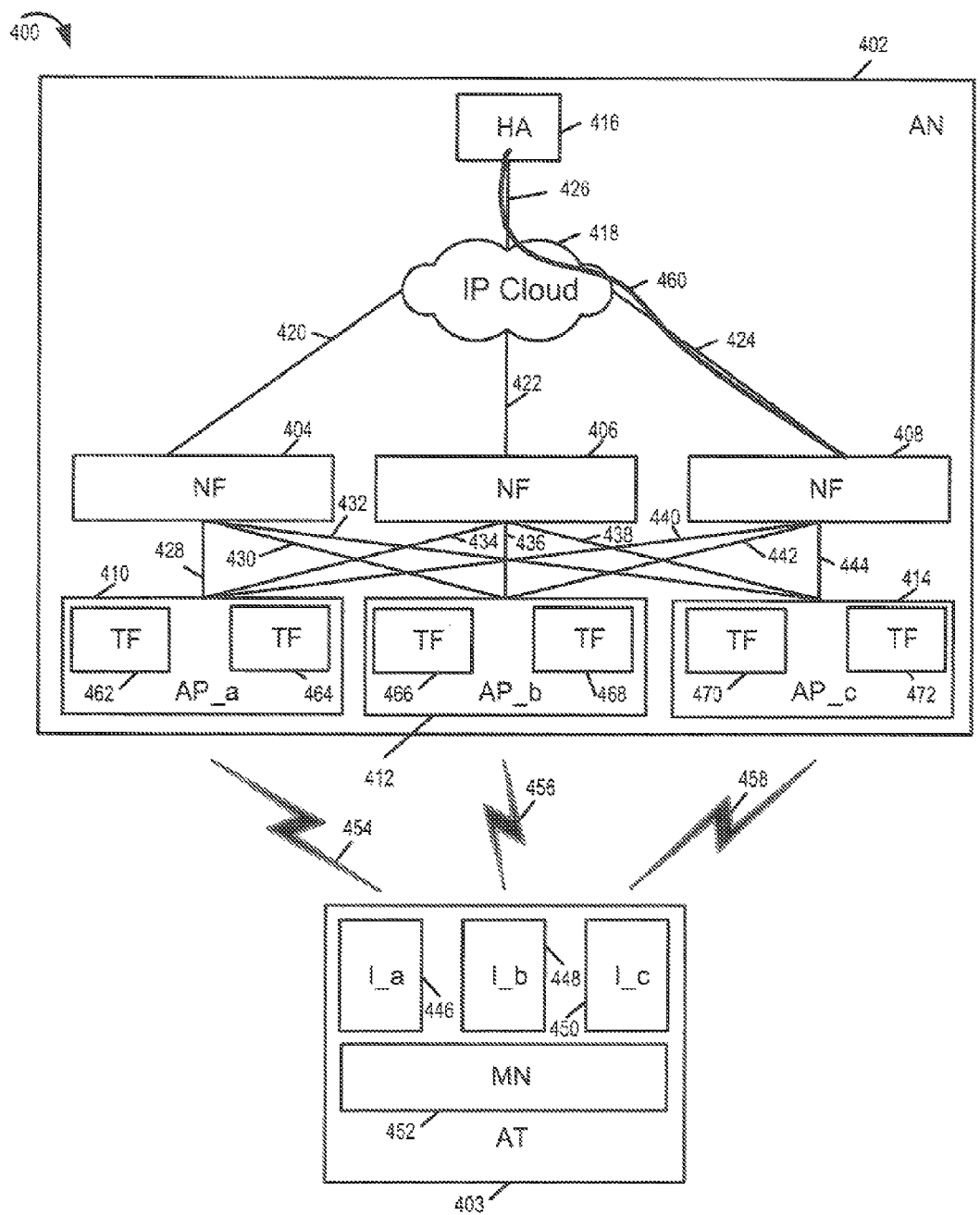

FIG. 4 illustrates an exemplary network 300 including a distributed AN 302 and an AT 303.

Distributed Network Architecture

In the distributed architecture shown in FIG. 4, the AN 302 comprises access points (AP) and home agents (HA). AN 302 includes a plurality of access points (APa 304, APb 306, APc 308) and home agent 310. In addition, AN 302 includes an IP cloud 312. The APs (304, 306, 308) are coupled to the IP cloud via links (314, 316, 318), respectively. The IP cloud 312 is coupled to the HA 310 via link 320.

An AP includes a:

Network function (NF):

One per AP, and multiple NFs can serve a single AT.

A single NF is the IP layer attachment point (IAP) for each AT, i.e., the NF to which the HA forwards packets sent to the AT. In the example of FIG. 4, NF 336 is the current IAP for AT 303, as shown by the line 322 in FIG. 4.

The IAP may change (L3 handoff) to optimize routing of packets over the backhaul to the AT.

The IAP also performs the function of the session master for the AT. (In some embodiments, only the session master can perform session configuration, or change the session state.)

The NF acts as the controller for each of the TFs in the AP and performs functions like allocating, managing and tearing down resources for an AT at the TF.

Transceiver functions (TF) or sector:

Multiple per AP, and multiple TFs can serve a single AT.

Provides the air interface attachment for the AT.

Can be different for the forward and reverse links.

Changes (L2 handoff) based on radio conditions.

In AN 302 APa 304 includes NF 324, TF 326 and TF 328. In AN 302 APb 306 includes NF 330, TF 332 and TF 334. In AN 302 APc 308 includes NF 336, TF 338 and TF 340.

An AT includes a:

Interface I_x presented to the mobile node (MN) for each NF in the active set.

Mobile node (MN) to support IP layer mobility at the access terminal.

APs communicate using a tunneling protocol defined over IP. The tunnel is an IP-in-IP tunnel for the data plane and an L2TP tunnel for the control plane.

Exemplary AT 303 includes a plurality of Interfaces (I_a 342, I_b 344, I_c 346) and MN 348. AT 303 can be, and sometimes is, coupled to AP_a 304 via wireless link 350. AT 303 can be, and sometimes is, coupled to AP_b 306 via wireless link 352. AT 303, can be, and sometimes is, coupled to AP_c 308 via wireless link 354.

FIG. 5 illustrates an exemplary network 400 including a distributed AN 402 and an AT 403.

In a centralized architecture shown in FIG. 5, the NF is no longer logically associated with a single TF, so the AN comprises network functions, access points and home agents. Exemplary AN 402 includes a plurality of NFs (404, 406, 408), a plurality of APs (AP_a 410, AP_b 412, AP_c 414), HA 416 and IP cloud 418. NF 404 is coupled to IP cloud 418 via link 420. NF 406 is coupled to IP cloud 418 via link 422. NF 408 is coupled to IP cloud 418 via link 424. IP cloud 418 is coupled to HA 416 via link 426. NF 404 is coupled to (AP_a 410, AP_b 412, AP_c 414) via links (428, 430, 432), respectively. NF 406 is coupled to (AP_a 410, AP_b 412, AP_c 414) via links (434, 436, 438), respectively. NF 408 is coupled to (AP_a 410, AP_b 412, AP_c 414) via links (440, 442, 444), respectively.

AP_a 410 includes TF 462 and TF 464. AP_b 412 includes TF 466 and TF 468. AP_c 414 includes TF 470 and TF 472.

Since an NF acts as the controller for a TF, and many NFs can be logically associated with a single TF, the NF controller for an AT, i.e., the NF communicating with an AT as a part of the active set, performs the functions of allocating, managing and tearing down resources for the TF at that AT. Therefore, multiple NFs may control resources at a single TF, although these resources are managed independently. In the example of FIG. 5, NF 408 is acting as an IAP for AT 403, as shown by the line 460.

The rest of the logical functions performed are the same as for the distributed architecture.

Exemplary AT 403 includes a plurality of Interfaces (I_a 446, I_b 448, I_c 450) and MN 452. AT 403 can be, and sometimes is, coupled to AP_a 410 via wireless link 454. AT 403 can be, and sometimes is, coupled to AP_b 412 via wireless link 456. AT 403 can be, and sometimes is, coupled to AP_c 414 via wireless link 458.

In systems like DO and 802.20, an AT obtains service from an AP by making an access attempt on an access channel of a particular sector (TF). The NF associated with the TF receiving the access attempt contacts the IAP that is the session master for the AT and retrieves a copy of the AT's session. (The AT indicates the identity of the IAP by including an UATI in the access payload. The UATI may be used as an IP address to directly address the IAP, or may be used to look up the address of the IAP.) On a successful access attempt, the AT is assigned air interface resources such as a MAC ID and data channels to communicate with that sector.

Additionally, the AT may send a report indicating the other sectors it can hear and their signal strengths. The TF receives the report and forwards it to a network based controller in the NF which in turn provides the AT with an active set. For DO and 802.20 as they are implemented today, there is exactly one NF that the AT can communicate with (except during an NF handoff when there are temporarily two). Each of the TFs in communication with the AT will forward the received data and signaling to this single NF. This NF also acts as a network-based controller for the AT and is responsible for negotiating and managing the allocation and tear down of resources for the AT to use with the sectors in the active set.

The active set is therefore the set of sectors in which the AT is assigned air interface resources. The AT will continue to send periodic reports and the network based controller may add or remove sectors from the active set as the AT moves around in the network.

NFs in the active set will also fetch a local copy of the session for the AT when they join the active set. The session is needed to communicate properly with the AT.

For a CDMA air link with soft handoff, on the uplink each of the sectors in the active set may try to decode an AT's transmission. On the downlink, each of the sectors in the active set may transmit to the AT simultaneously, and the AT combines the received transmissions to decode the packet.

For an OFDMA system, or a system without soft handoff, a function of the active set is to allow the AT to switch quickly between sectors in the active set and maintain service without having to make a new access attempt. An access attempt is generally much slower than a switch between members of the active set, since the active set member already has the session and the air interface resources assigned to the AT. Therefore, an active set is useful to do handoff without affecting the QoS service of active applications.

When, an AT and the session master in the IAP negotiate attributes, or alternatively the state of the connection changes, the new values for the attributes or the new state need to be distributed to each of the sectors in the active set in a timely manner to ensure optimal service from each sector. In some cases, for example if the type of headers changes, or security keys change, an AT may not be able to communicate at all with a sector until these changes are propagated to that sector. Thus every member of the active set should be updated when the session changes. Some changes may be less critical to synchronize than others.

There are three main types of state or context found in the network for an AT that has an active connection:

Data state is the state in the network on the data path between the AT and the IAP or an NF during a connection. Data state includes things such as header compressor state or RLP flow states which are very dynamic and difficult to transfer.

Session state is the state in the network on the control path between the AT and the IAP that is preserved when a connection is closed. Session state includes the value of the attributes that are negotiated between the AT and the IAP. These attributes affect the characteristics of the connection and the service received by the AT. For example, an AT may negotiate the QoS configuration for a new application and supply new filter and flow specifications to the network indicating the QoS service requirements for the application. As another example the AT may negotiate the size and type of the headers used in communication with the AN. The negotiation of a new set of attributes is defined as a session change.

Connection state is the state in the network on the control path between the AT and the IAP or an NF that is not preserved when a connection closes and the AT is idle. Connection state may include such information as power control loop values, soft handoff timing, and active set information.

In an IAP or L3 handoff the three types of state may need to be transferred between the old IAP and the new IAP. If only an idle AT can make an L3 handoff, then only the session state needs to be transferred. To support L3 handoff for an active AT, the data and connection state may also need to be transferred.

Systems like DO and 802.20, make L3 handoff of the data state simple by defining multiple routes (or data stacks), where the data state for each route is local to that route, i.e., the routes each have independent data state. By associating each IAP with a different route, the data state does not need to be transferred in a handoff. A further, even better step, is to associate each NF with a different route in which case L3 handoff is completely transparent to the data state, except for possible packet reordering.

Since the data state has multiple routes, the next logical step to support L3 handoff for an active AT is to move the control of the connection state from the IAP and make it local to each NF in the active set. This is done by defining multiple control routes (or control stacks) and defining the air interface so that the control stacks are independent and local to each NF. This may require that some of the negotiating and managing the allocation and tear down of resources of the connection state is transferred to the AT since there is no longer a single NF to manage all the members of the active set. It may also make some additional requirements on the air interface design to avoid a tight coupling between TFs—since different TFs may not share the same NF—in the active set. For instance, to operate in an optimal way, it is preferable to eliminate all tight synchronization between TFs that do not have the same NF, such as power control loops, soft handoff, etc.

Pushing the data and connection state down to the NFs eliminates the need to transfer this state on a L3 handoff, and also should make the NF-to-NF interface simpler.

The system therefore defines multiple independent data and control stacks (called interfaces in FIG. 4 and FIG. 5), in the AT to communicate with different NFs as needed, as well as the addressing mechanisms for the AT and TFs to logically distinguish between these stacks.

Fundamentally, some session state (QoS profile, security keys, attribute values, etc.) cannot be made local to an NF (or IAP) because it is too expensive to negotiate every time there is a NF (or a L3) handoff. Also the session state is relatively static and easy to transfer. What is needed are mechanisms to manage and update the session state as it changes and during IAP handoff where the session master moves.

Optimizing the session state transfer for L3 handoff is a useful feature for every system regardless of the network architecture since it simplifies network interfaces and should also improve the seamlessness of handoff.

A separate but related issue is the AT control of L3 handoff. Today, in systems like DO and 802.20, the AT is aware of the L3 handoff since it allocates and tears down local stacks, but it has no control of when L3 handoff occurs. This is called network-based mobility management. The question is whether to make AT the handoff controller, i.e., to use AT based mobility management?

To support fault tolerance and load balancing, the network needs either to be able to make the handoff or have a mechanism to signal to the AT to do a handoff. Thus if AT based mobility management is used, the network still needs a mechanism to indicate when it should occur.

AT based mobility management has some obvious advantages, such as allowing for a single mechanism for inter and intra technology, or global and local mobility. It also simplifies the network interfaces further by not requiring the network elements to determine when to do handoff.

The primary reason systems like DO and 802.20 use network based mobility is that AT based mobility is not optimized to work fast enough to support voice. A secondary reason is the tunneling overhead introduced by terminating the mobile IP tunnels (for MJPv6) in the AT. The mobility latency can be solved by forwarding data using tunnels between the current and previous forward link serving sector, as well as possibly using bicasting, where the data is sent to multiple NFs in the active set simultaneously.

In SimpleRAN, there maybe two types of handoff, for example L2 and L3 handoff.

Layer 2 or L2 handoff refers to changing of the forward link or reverse link serving sector (TF). L3 handoff refers to changing of the IAP, and L2 handoff should be as fast as possible in response to changing radio conditions. Systems like DO and 802.20 use PHY layer signaling to make L2 handoff fast.

L2 handoff is transfer of the serving sector TF for the forward (FL) or reverse (RL) links. A handoff occurs when the AT selects a new serving sector in the active set based on the RF conditions seen at the AT for that sector. The AT performs filtered measurements on the RF conditions for the forward and reverse links for all sectors in the active set. For instance, in 802.20 for the forward link the AT can measure the $SIN_R$ on the acquisition pilots, the common pilot channel (if present), and the pilots on the shared signaling channel, to select its desired FL serving sector. For the reverse link, the AT estimates the CQI erasure rate for each sector in the active set based on the up/down power control commands to the AT from the sector.

L2 handoff is initiated when the AT requests a different FL or RL serving sector via a reverse link control channel. Dedicated resources are assigned at a TF when it is included in the active set for an AT. The TF is already configured to support the AT before the handoff request. The target serving sector detects the handoff request and completes the handoff with the assignment of traffic resources to the AT. The forward link TF handoff requires a round trip of messaging between the source TF or IAP and target TF in order to receive data for the target TF to transmit. For reverse link TF handoff, the target TF may immediately assign resources to the AT.

L3 handoff is the transfer of the IAP. L3 handoff involves a HA binding update with the new IAP and requires a session transfer to the new IAP for the control-plane. L3 handoff is asynchronous to L2 handoff in the system so that L2 handoff is not limited by MIPv6 handoff signaling speed.

L3 handoff is supported over the air in the system by defining an independent route to each NF. Each flow provides multiple routes for transmission and reception of higher layer packets. The route indicates which NF processed the packet. For example, one NF may be associated at the TF and over the air as Route A, while another NF may be associated with Route B. A serving TF can simultaneously send packets to an AT from both Route A and Route B. i.e., from both NFs, using a separate and independent sequence space for each.

There are at least two key ideas in the system design to ensure the QoS treatment for a mobile and its traffic is retained over each handoff mode:

Decoupling of L2 and L3 handoff

Reserving air interface resources and fetching the session at the target NF or TF before the handoff occurs to minimize the data flow interruption during the handoff. This is done by adding the target TF and NF to the active set.

The system is designed to separate L2 and L3 handoff in order to allow the system to support EF traffic during high rates of L2 handoff. L3 handoff requires a binding update, which is limited to a rate of 2 to 3 per second. In order to allow a faster L2 handoff rate of 20 to 30 Hz, L2 and L3 handoff are designed to be independent and asynchronous.

For L2 handoff, the active set management allows all the TFs in the active set to be configured and dedicated resources assigned in order to be ready to serve the AT in the event of an L2 handoff.

A novel method in accordance with various embodiments provides a method for the AT to manage its Active Set without the need for an Active Set Control Protocol operating between APs.

Call Flow in an exemplary novel embodiment will now be described with respect to drawing 600 of FIG. 6. Drawing 600 includes an access terminal 602, a first access point, APa 604, a second access point, APb 606, and an anchor APc 608. APa 604 is a current serving AP for AT 602. APb is a new AP with respect to AT 602. APc 608 is the IAP for AT 602.

Consider the case when APa 604 is the currently serving AP and the AT 602 wishes to add APb 606 to the Active Set (say after measuring strong signal strength from APb). For example, AT 602 sees a strong pilot from APb 606 as indicated by block 610 and wishes to add APb 606 to the Active Set. In this case the following call flow shows:

1. When the AT 602 determines that the signal from APb 606 is sufficiently strong, it decides to request APb 606 be added to the Active Set by sending a ConnectionRequest message. Along with the message, AT 602 sends the ID of APb 606 and a list of currently assigned MAC resources. Connection request message, APb-ID and list of currently assigned resources is communicated from AT 602 to APa 604 as indicated by arrow 612.

2. APa 604 gets this message 612 (because the AT is currently being served by APa 604) and forwards the message to APb 606 (using the ID of APb 606 that was sent by APa 604). Such forwarding may be attained by L2TP tunneling. The forwarded message 614 includes the ID of the AT 602.

3. APb 606 gets the message 614 from APa 604 and fetches the session (that includes security keys, QoS settings etc.) from the session holder. The address of the session holder is determined using the ID of the AT (or alternatively, message 612 may contain the address of the session holder). In this example, APc 608 is the session holder and Get Session message 616 is sent from APb 606 to APc 608.

4. The session holder 608 responds to APb 606 with the session information communicated via Get Session Response message 618 from APc 608 to APb 606.

5. APb 606 responds with a ConnectionResponse message 620 that includes assigned resources. These resources are determined by APb 606 to be consistent with the MAC resources currently assigned to the AT 602 (as reported by the AP in message 612). In this example Connection Response message 620 is communicated from APb 606 to APa 604 via APc 608.

6. APa 604 receives the ConnectionResponse message 620 and forwards the message 620 to the AT 602 as Connection Response message 622. On receiving this message 622, the AT 602 includes the assigned resources in its Active Set as indicated by block 624.

7. To improve air link resource usage, the AT 602 may send a ResourceUpdateRequest message 626 to request a change of resources assigned by APa 604. This may happen if the resources assigned by APb 606 are not consistent with those provided by APa 604.

8. APa 604 may, and sometimes does, assign new resources in a ResourceUpdateResponse message 628 communicated from APa 604 to AT 602. Then the AT 602 updates APa resources as indicated by block 630.

The Resources that may be negotiated in the Active set (in step 7 and 8 in the design of this exemplary embodiment) may include:

1. Control Channel Size (the control channel may be TDM, FDM, CDM)
2. Control Channel Parameters (the exact TDM slot, FDM slot, CDM code, modulation etc. to be used on the control channel)
3. Same parameters as above for forward or reverse data channel AT managed Active Set Management is useful because of the following:

1. During the active set management process, no network entity (i.e. no access point) needs to be aware of
   a. Members of the active set
   b. Resources assigned by other members of the active set
   Only the AT 602 is aware of these.
2. Since the active set information is not stored at any place in the network, the above feature allows for easier handoff of the controller in the network. Such easy handoff is particularly useful for next generation systems that support a distributed (non-centralized) architecture.
3. While relaying messages in steps 2 and 6 above, the AP does not interpret the message, it just forwards it. This removes the need for a complicated protocol.
4. This design makes it easier to support different versions of message formats being exchanged with APa 604 and APb 606.

Figure 7:
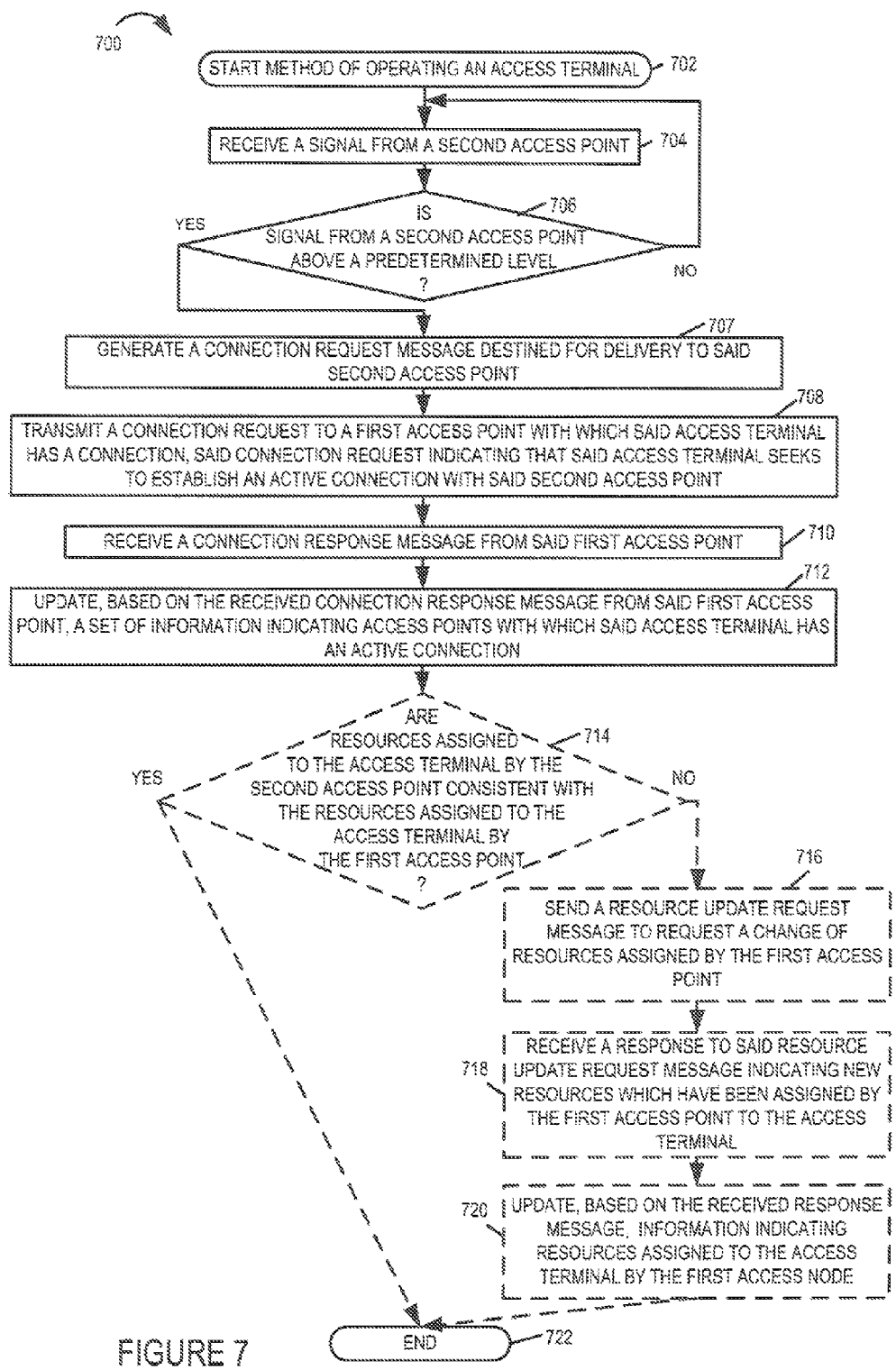
FIG. 7 is a flowchart of an exemplary method of operating an access terminal in accordance with various embodiments.

FIG. 7 is a flowchart 700 of an exemplary method of operating an access terminal, e.g., a mobile wireless terminal, in accordance with various embodiments. Operation of the exemplary method starts in step 702, where the access terminal is powered on initialized, establishes a connection with a first access point and monitors for a signal from a second access point. Operation proceeds from step 702 to step 704, in which the access terminal receives a signal, e.g., pilot signal, from a second access point. Then, in step 706, the access terminal determines if the received signal from the second access point is above a predetermined level. If the received signal from the second access point is above the predetermined level, then operation proceeds from step 706 to step 707; otherwise, operation proceeds from step 706 to step 704, where the access terminal receives another signal to be evaluated.

Returning to step 707, in step 707, the access terminal generates a connection request message destined for delivery to said second access point. Operation proceeds from step 707 to step 708. In step 708, the access terminal transmits a connection request to a first access point with which said access terminal has a connection, said connection request indicating that said access terminal seeks to establish an active connection with said second access point. In some embodiments, the connection request includes the connection request message and an identifier associated with the connection request message which identifies the second access point. In some embodiments, the connection request message is directed through the first access point to the second access point identified by said identifier.

In various embodiments resource information indicating resources assigned by the first access point to the access terminal is communicated in said connection request to the first access point. The connection request may, and in some embodiments does include information on resources allocated by other access points to the access terminal as well. This resource allocation information may indicate resources allocated by, e.g., third and fourth access points in the access terminal's active set. Such resource information may be in addition to, or an alterative to, the information about resources allocated by the first access terminal. Thus, in some embodiments, the connection request message includes a list of MAC resources currently assigned to said access terminal by multiple different access points in the wireless terminals active set. In some such embodiments, the resource information is included as part of the connection request message. In other embodiments, the resource information is included with, e.g., sent with, the connection request message.

Exemplary resources assigned to the access terminal include, e.g., control channel resources, traffic channel resources and MAC identifiers. In some embodiments, the resources assigned by the first access point include a control channel resource and the connection request message includes at least one of a control channel size and a control channel parameter used to indicate information about a control channel resource assigned to the access terminal.

In some embodiments, the connection request includes a list of MAC resources currently assigned to the access terminal.

Operation proceeds from step 708 to step 710, in which the access terminal receives a connection response message from the first access point. In various embodiments, the connection response message includes information indicating the resources assigned by the second access point to the access terminal. Operation proceeds from step 710 to step 712.

In step 712 the access terminal updates, based on the received connection response message from said first access point, a set of information indicating access points with which said access terminal has an active connection. In some embodiments, the set of information indicating access points with which the access terminal has an active connection is an active connection information set stored in said access terminal, said active connection information set storing a full list of access points with which said active terminal has an active connection, said full list being maintained in said access terminal and not at any other location in the network.

In various embodiments, the active connection information set includes information corresponding to resources assigned to the access terminal by different access points, said active connection information set including information on assigned resources which is not maintained in a single node anywhere else in the network.

In some embodiments, updating a set of information includes storing information indicating resources assigned to the access terminal by the second access point. Exemplary resources assigned to the access terminal include, e.g., control channel resources, traffic channel resources and MAC identifiers. In some embodiments, the resources assigned by the second access point include a control channel resource and the connection response message includes a t least one of a control channel size and a control channel parameter used to indicate information about a control channel resource assigned to the access terminal.

In some embodiments, the exemplary method includes steps 714, 716, 718 and 720. In such an embodiment, operation proceeds from step 712 to step 714; otherwise operation proceeds from step 712 to end step 722.

Returning to step 714, in step 714, the access terminal determines if resources assigned to the access terminal by the second access point are consistent with resources assigned to the access terminal by the first access point. If the resources assigned to the access terminal by the second access point are consistent with the resources assigned to the access terminal by the first access point, the operation proceeds from step 714 to end 722. If the resources assigned to the access terminal by the second access point are not consistent with the resources assigned to the access terminal by the first access point, the operation proceeds from step 714 to step 716. In step 716, the access terminal sends a resource update request message to request a change of resources assigned by the first access terminal, and then in step 718, the access terminal receives a response to said resource update request message indicating new resources which have been assigned by the first access point to the access terminal. Operation proceeds from step 718 to step 720. In step 720, the access terminal updates, based on the received response message of step 718, information indicating resources assigned to the access terminal by the first access node. Operation proceeds from step 720 to end 722.

Figure 6:
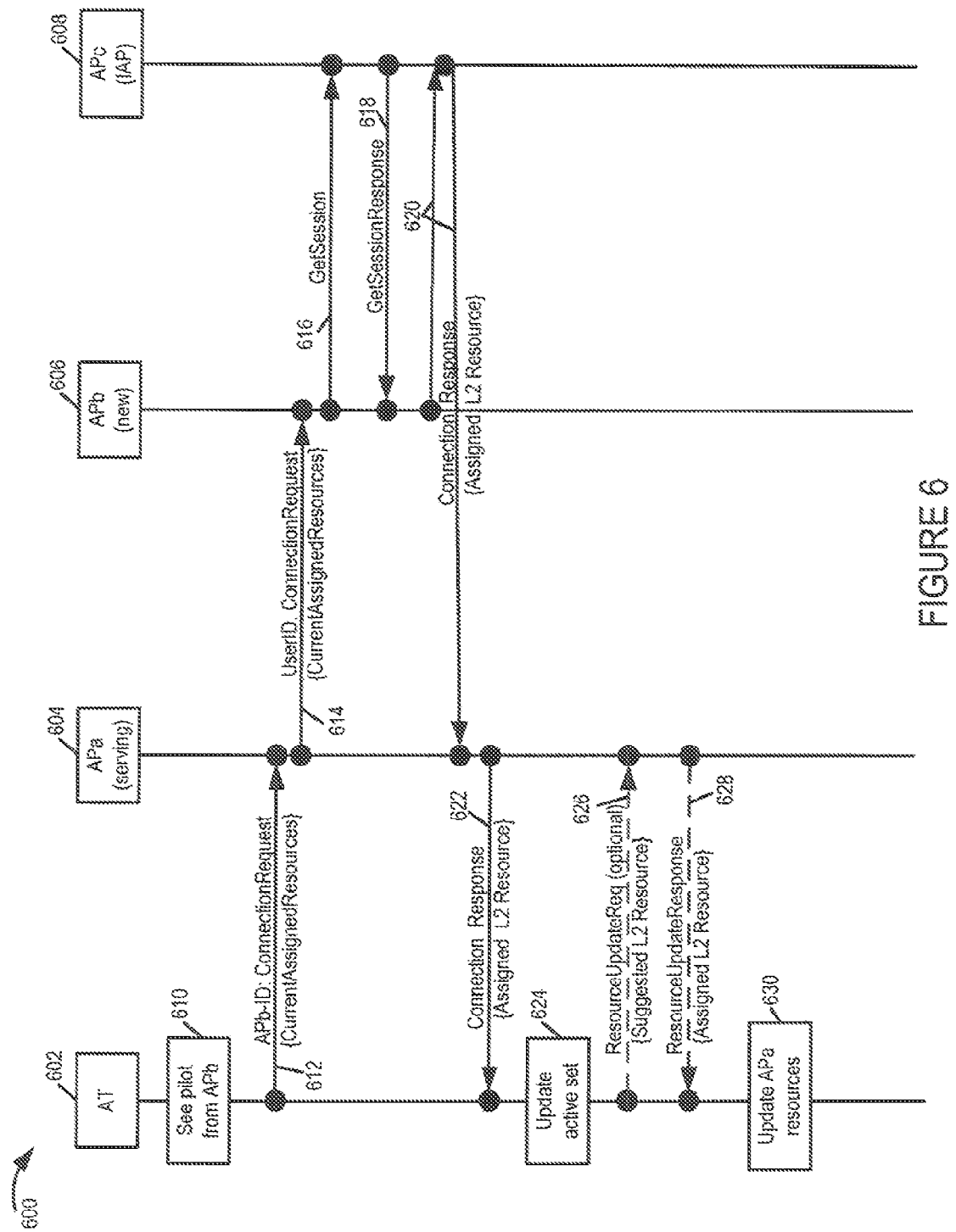
FIG. 6 illustrates exemplary call flow in an exemplary novel embodiment in a novel communications network including an access terminal and a plurality of access points.

In one exemplary embodiment with regard to flowchart 700, the access terminal is access terminal 602 of FIG. 6, the first access point is access point 604 of FIG. 6, and the second access point is access point 606 of FIG. 6. In addition, continuing with the example, the transmitted connection request of step 708 is connection request 612 of FIG. 6, the received connection response message of step 710 is connection request response 622 of FIG. 6, the transmitted resource update request message of step 716 is resource update request 626 of FIG. 6, and the received resource update response message of step 718 is resource response update 628 of FIG. 6.

Figure 8:
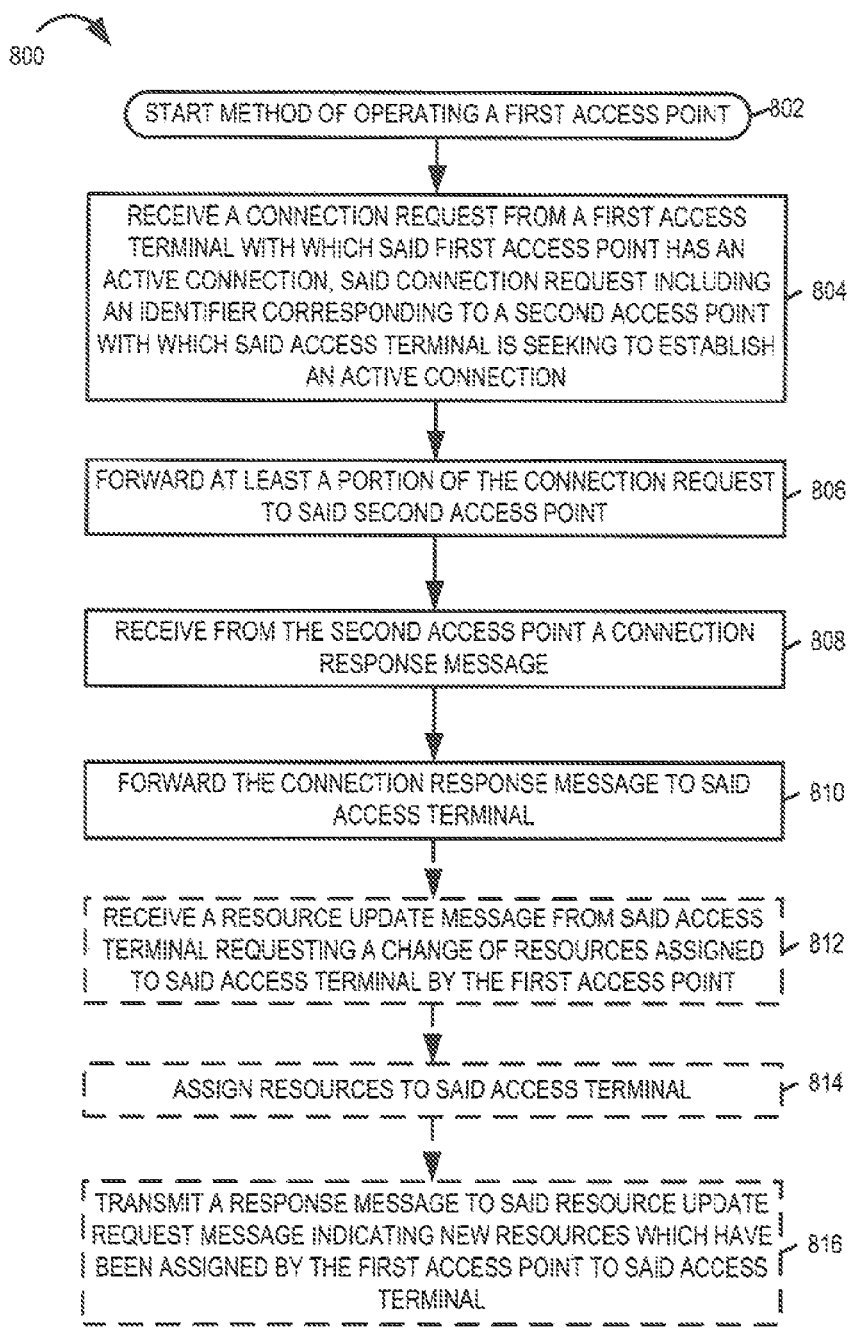
FIG. 8 is a flowchart of an exemplary method of operating an access point in accordance with various embodiments.

FIG. 8 is a flowchart 800 of an exemplary method of operating a first access point in accordance with various embodiments. Operation starts in step 802, where the first access point has been powered on and initialized and has established an active connection with an active terminal. Operation proceeds from start step 802 to step 804.

In step 804, the first access point receives a connection request from a first access terminal with which said first access point has an active connection, said connection request including an identifier corresponding to a second access point with which said access terminal is seeking to establish an active connection. In some embodiments, information including resources assigned by the first access point is included in the connection request received from the access terminal. Operation proceeds from step 804 to step 806.

In step 806, the first access point forwards at least a portion of the connection request to said second access point. In some embodiments, the forwarded portion of the connection request includes a connection request message and forwarding of the portion of the connection request includes using said identifier corresponding to the second access point to determine the destination of the forwarded connection request message. In various embodiments, information indicating resources assigned by the first access point to the access terminal is communicated to said second access point. In some embodiments, the information indicating resources assigned by the first access point is included in the connection request received from the access terminal, e.g., as part of the connection request message or in addition to the connection request message. In some embodiments, the information indicating resources assigned which is communicated to the second access point is provided by the first access terminal. In some other embodiments, the information indicating resources assigned which is communicated to the second access point is provided by the first access point.

In various embodiments, the forwarded connection request message includes one of an access terminal identifier and an address corresponding to a device which holds session information for a communications session in which said access terminal is involved. In some embodiments, the portion of the connection request is in the form of a message and forwarding is performed using Layer 2 Transport Tunneling to forward said connection request message to said second access node.

Then, in step 808, the first access point receives from the second access point a connection response message. In some embodiments, the connection response message is received via a Layer 2 Transport Tunnel between the first and second access nodes. In various embodiments, the connection response message includes MAC resources assigned to the access terminal by the second access point. In some such embodiments, the MAC resources include at least one control channel resource. In some embodiments, the connection response message includes at least one of a control channel size and a control channel parameter used to indicate information about a control channel resource assigned to the access terminal. Next, in step 810, the first access point forwards the connection response message to said access terminal.

In some embodiments, during at least some times, steps 812, 814 and 816 are performed. In such a case, operation proceeds from step 810 to step 812. In step 812, the first access point receives a resource update message from said access terminal requesting a change of resources assigned to said access terminal by the first access point. Then, in step 814, the first access point assigns resources to said access terminal. Operation proceeds from step 814 to step 816. In step 816, the first access point transmits a response message to said resource update request message indicating new resources which have been assigned by the first access point to said access terminal. The new resources assigned by the first access point to the access terminal are, in various embodiments, consistent with the resources assigned by the second access point to the access terminal.

In one exemplary embodiment with regard to flowchart 800, the access terminal is access terminal 602 of FIG. 6, the first access point is access point 604 of FIG. 6, and the second access point is access point 606 of FIG. 6. In addition, continuing with the example, the received connection request of step 804 is connection request 612 of FIG. 6, the forwarded connection request of step 806 is connection request 614 of FIG. 6, the received connection response message of step 808 is connection request response 620 of FIG. 6, the forwarded connection response message of step 810 is connection response 622 of FIG. 6, the received resource update request message of step 812 is resource update request 626 of FIG. 6, and the transmitted resource update response message of step 816 is resource response update 628 of FIG. 6.

Figure 9:
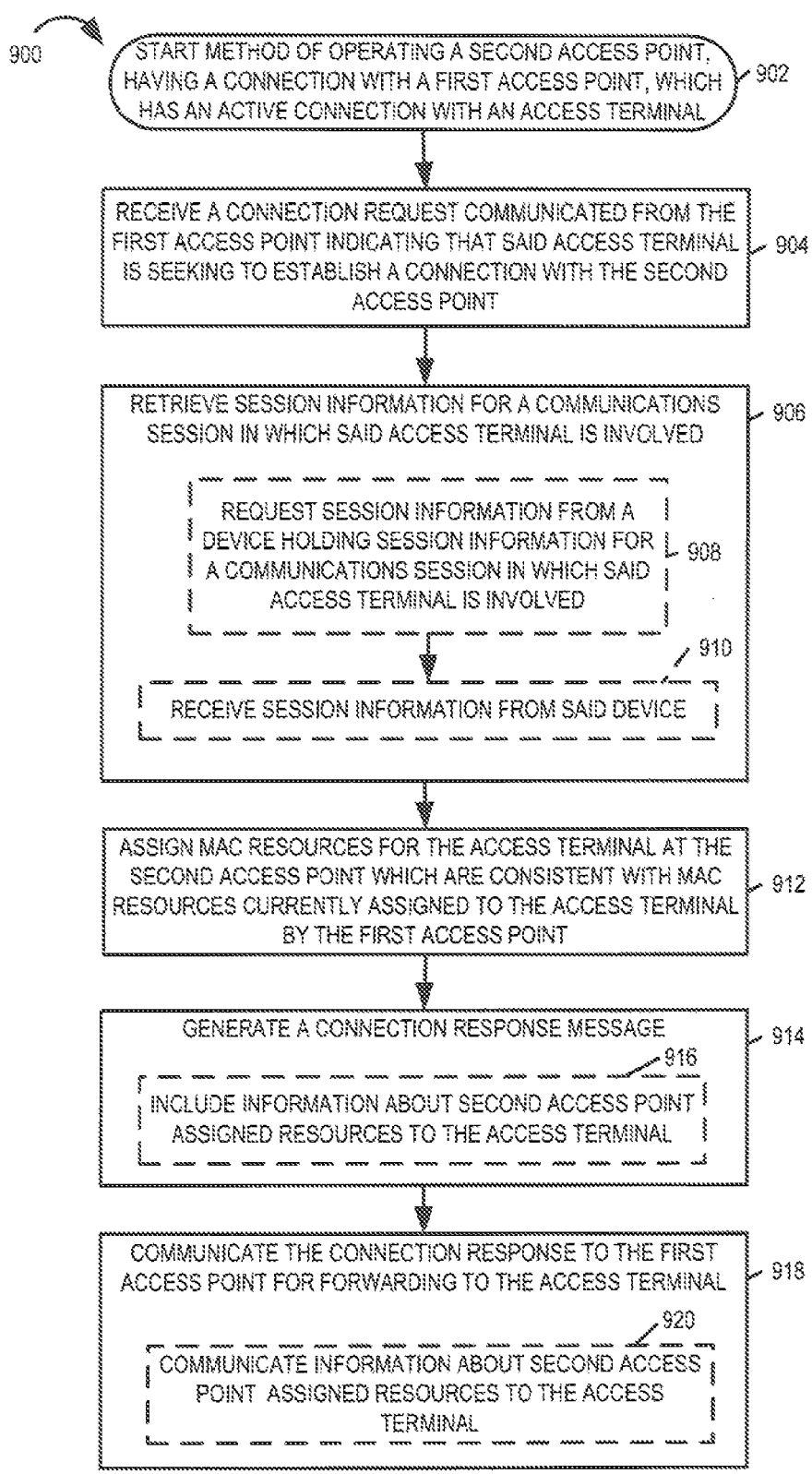
FIG. 9 is a flowchart of an exemplary method of operating an access point in accordance with various embodiments.

FIG. 9 is a flowchart 900 of an exemplary method of operating a second access point in accordance with various embodiments. The second access point has a connection with a first access point, and said first point has an active connection with an access terminal. Operation of the exemplary methods starts in step 902 and proceeds to step 904. In step 904, the second access point receives a connection request communicated from the first access point indicating that the access terminal is seeking to establish a connection with the second access point. In some embodiments, the connection request includes one of: an access terminal identifier and an address corresponding to a device holding session information for a communications session in which said access terminal is involved. The device holding session information is, e.g., a third access point. In various embodiments, information indicating resources assigned to the access terminal by the first access point is received in the connection request received from the first access node. Operation proceeds from step 904 to step 906.

In step 906, the second access point retrieves session information for a communications session in which said access terminal is involved. In various embodiments step 906 includes sub-steps 908 and 910. In sub-step 908, the second access terminal requests session information from a device holding session information for a communications session in which said access terminal is involved. Then, in sub-step 910 the second access point receives session information from the device. Operation proceeds from step 906 to step 912.

In step 912, the second access point assigns MAC resources for the access terminal at the second access point which are consistent with MAC resources currently assigned to the access terminal by the first access point. In some embodiments, a control channel assigned at the second access point is of the same type of control channel assigned at the first access point. In various embodiments, the amount of control channel resources assigned to the access terminal at the first and second access points is the same or substantially the same. Operation proceeds from step 912 to step 914. In step 914, the second access point generates a connection response message. In some embodiments step 914 includes sub-step 916, in which the second access point includes information about second access point assigned resources to the access terminal.

Then, in step 918, the second access point communicates the connection response to the first access point for forwarding to the access terminal. In various embodiments step 918 includes sub-step 920, in which the second access point communicates information about the second access point assigned resources to the access terminal. In some such embodiments communicating information includes sending a message to the first access point in a Layer 2 tunnel between the second access node and the first access node.

In one exemplary embodiment with regard to flowchart 900, the access terminal is access terminal 602 of FIG. 6, the first access point is access point 604 of FIG. 6, the second access point is access point 606 of FIG. 6, and the device holding session information is access point 608. In addition, continuing with the example, the received connection request of step 904 is connection request 614 of FIG. 6, the request for session information of sub-step 908 is communicated via GetSession message 616 of FIG. 6, the session information of sub-step 910 is received in GetSessionResponse message 618 of FIG. 6, and the generated connection response message of steps 914 and 918 is connection response message 620 of FIG. 6.

Figure 10:
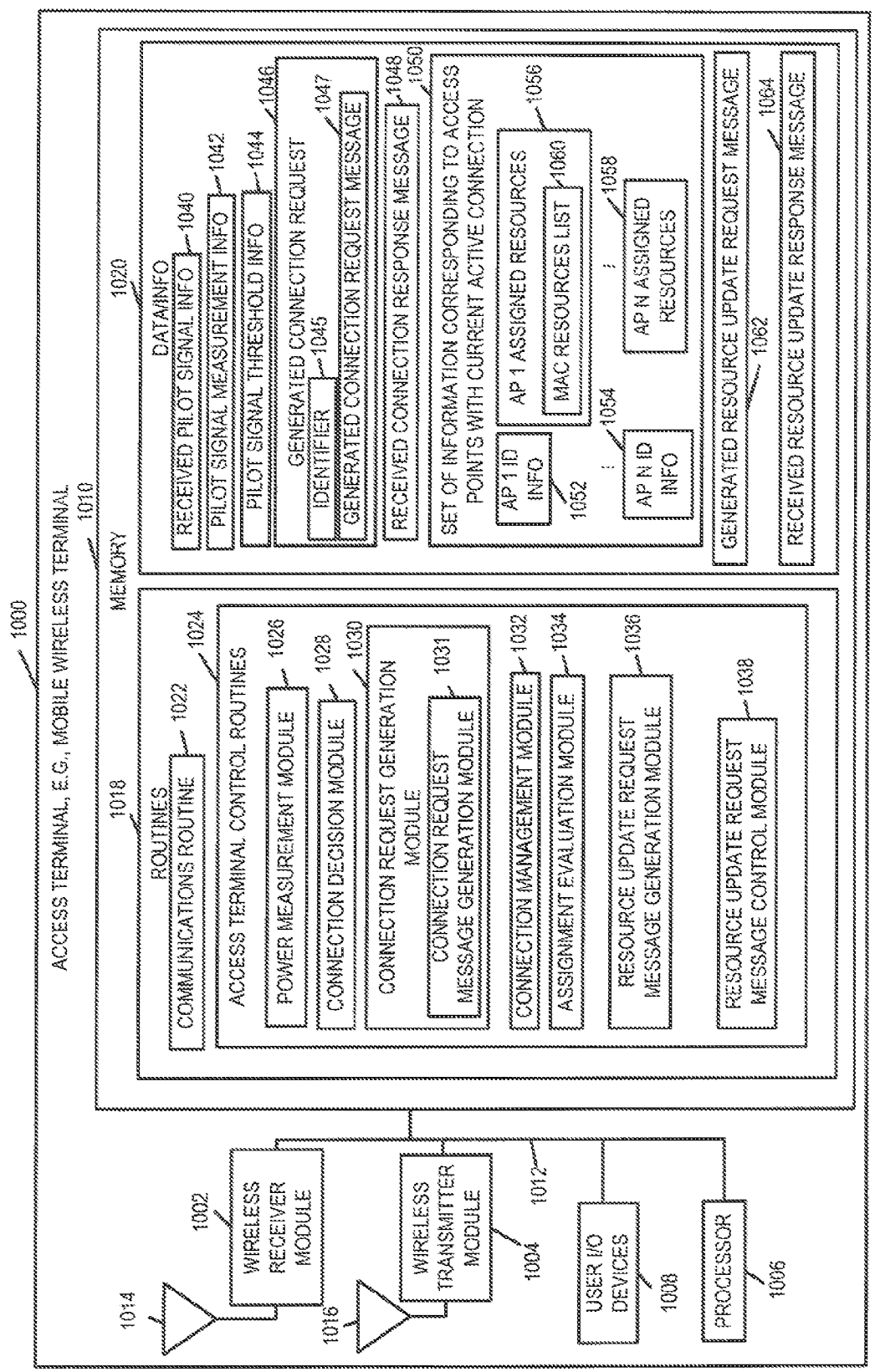
FIG. 10 is a drawing of an exemplary access terminal in accordance with various embodiments.

FIG. 10 is a drawing of an exemplary access terminal 1000, e.g., mobile wireless terminal, in accordance with various embodiments. Exemplary access terminal 1000 is, e.g., access terminal 602 of FIG. 6. Exemplary access terminal 1000 is, e.g., an access terminal which implements the method of flowchart 700 of FIG. 7. Exemplary access terminal 1000 includes a wireless receiver module 1002, a wireless transmitter module 1004, a processor 1006, user I/O device 1008 and a memory 1010 coupled together via a bus 1012 over which the various elements may interchange data and information. Memory 1010 includes routines 1018 and data/information 1020. The processor 1006, e.g., a CPU, executes the routines 1018 and uses the data/information 1020 in memory 1010 to control the operation of the access terminal 1000 and implement methods, e.g., the method of flowchart 700 of FIG. 7.

Wireless receiver module 1002, e.g., an OFDM receiver, is coupled to receive antenna 1014 via which the access terminal 1000 receives downlink signals from access points. Downlink signals include, e.g., pilot channel signals, connection response signals, and resource request response signals. Wireless receiver module 1002 receives a connection response message from a first access point.

Wireless transmitter module 1004, e.g., an OFDM transmitter, is coupled to transmit antenna 1016 via which the access terminal 1000 transmits uplink signals to access points. Uplink signals include, e.g., connection request signals and resource request update signals. Wireless transmitter module 1004 transmits a connection request to a first access point with which the access terminal 1000 has a connection, said connection request indicates that the access terminal seeks to establish an active connection with a second access point.

In some embodiments, multiple antennas are used, e.g., in a MIMO configuration. In some embodiments, the same antenna or antennas are used for the receiver and transmitter.

User I/O devices 1008 includes, e.g., microphone, keyboard, keypad, switches, camera, speaker, display, etc. User I/O devices 1008 allow a user of access terminal 1000 to input data/information, access output data/information, and control at least some functions of the wireless terminal, e.g., attempt to establish a communications session.

Routines 1018 include a communications routine 1022 and access terminal control routines 1024. The communications routine 1022 implements the various communications protocols used by the access terminal. The access terminal control routines include a power measurement module 1026, a connection decision module 1028, a connection request generation module 1030, a connection management module 1032, an assignment evaluation module 1034, a resource update request message generation module 1036 and a resource update request message control module 1038. Connection request generation module 1030 includes a connection request message generation module 1031.

Data/information 1020 includes received pilot signal information 1040, pilot signal measurement information 1042, pilot signal threshold information 1044, a generated connection request 1046, a received connection response message 1048, a set of information corresponding to access points with current active connection 1050, a generated resource update request message 1062 and a received resource update response message 1064. Set of information 1050 includes information identifying access points with which access terminal 1000 has a current active connection (API identification information 1052, . . . , AP N ID information 1054), and corresponding resource allocation information (AP I assigned resources 1056, . . . , AP N assigned resources 1058). Exemplary API assigned resources 1056 include control channel resources, traffic channel resources and identification information, e.g., a MAC identifier. Generated connection request 1046 includes an identifier 1045 and a generated connection request message 1047.

Power measurement module 1026 determines whether or not a signal from an access point, e.g., from a second access point, is above a predetermined threshold. For example, power measurement module 1026 processes a signal from an access point with which the access terminal does not have a current active connection, e.g., received pilot signal 1040. As part of the processing the power measurement module 1026 measures the received signal strength obtaining pilot signal strength information 1042 and then compares the measured strength level to pilot signal threshold information 1044 to determine if a minimum level has been exceeded. Connection decision module 1028 decides whether or not to generate a connection request as a function of the determination of the power measurement module 1026.

Connection request generation module 1030 generates a connection request, e.g., generated connection request 1046. Connection request message generation module 1031 generates a connection request message, e.g., generated connection request message 1047, destined for delivery to a second access point. In some embodiments the generated connection request includes a connection request message and an identifier, e.g., identifier 1045, associated with the connection request message which identifies the access point with which the access terminal seeks to have an active connection, e.g., the second access point. In various embodiments, the connection request message is directed through the first access point which received the connection request to the second access point identified by the identifier.

In various embodiments, resource information indicating resources assigned by an access point with which the access terminal has a current active connection, e.g., the first access node, are communicated in said connection request transmitted to said first access node, said connection request seeking to connect access terminal 1000 to another access node, e.g., a second access node. In some embodiments, the connection request message generation module 1031 includes such resource information in a generated connection request message. In some embodiments, the connection request generation module 1030 includes such resource information along with the connection request message as part of the connection request. In some embodiments, the connection request includes a list of MAC resources 1060 currently assigned to said access terminal. In various embodiments, the resources assigned by the second access point include a control channel resource, and the connection response message includes at least one of a control channel size and a control channel parameter used to indicate information about a control channel resource assigned to the access terminal 1000.

Connection management module 1032 updates, based on a received connection response message, the set of information indicating access points with which said access terminal has an active connection 1052. For example, a second access point and corresponding assigned resources is added to the stored information in response to a received connection response message. In various embodiments the connection response message includes information indicating resources assigned by the access point which was requested to be added, e.g., the second access point. Connection management module 1032 stores in the set of information 1050 information indicating resources assigned to the access terminal corresponding to an access point which is being added to the set of active access points from the AT's perspective, e.g., a second access point.

Assignment evaluation module 1034 determines if resources assigned to the access terminal by a second access point are not consistent with resources assigned to the access terminal by the first access point.

Resource update request message generation module 1036 generates a resource update request message, e.g., message 1062, which requests a change of resource by an access point, e.g., a change of resources by a first access point with which the access terminal has had an ongoing active connection.

Resource update request message control module 1038 controls the transmitter module 1004 to send a generated resource update request message in response to the assignment evaluation module 1034 determining that the resources assigned to the access terminal by a second access point are not consistent with the resources assigned to the access terminal by the first access point.

Connection management module 1032 also updates the set of information 1050 to indicate new resources assigned by the first access point to the access terminal. For example, the first access point may, and sometimes does, assign new resources to the access terminal and communicate the assignment in a resource update response message which is received by receiver module 1022, e.g., received resource update response message 1064.

In some embodiments, the set of information indicating access points with which the access terminal has an active connection 1050 is an active connection information set stored in the access terminal 1000, said active connection information set storing a full list of access points with which said access terminal has an active connection, said full list being maintained in said access terminal and not at any other location in the network. In some such embodiments during at least some times, the active connection information set includes information corresponding to resources assigned to said access terminal 1000 by different access points, said active connection information set including information on assigned resources which is not maintained in a single node anywhere else in said network.

Figure 11:
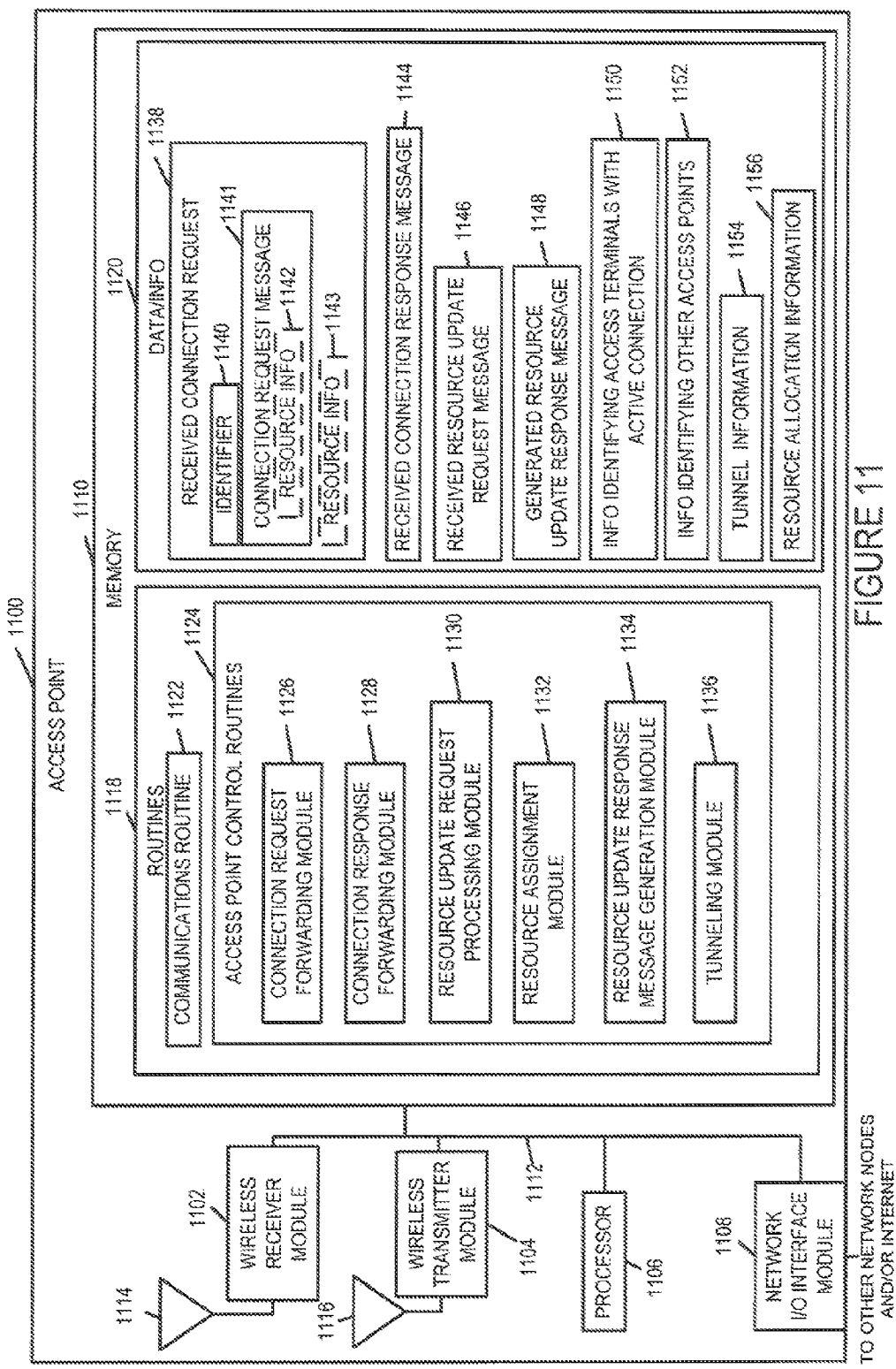
FIG. 11 is a drawing of an exemplary access point, e.g., a first access point, in accordance with various embodiments.

FIG. 11 is a drawing of an exemplary access point 1100 in accordance with various embodiments. Access point 1100 is, e.g., serving access point A 604 of FIG. 6. Access point 1100 is sometimes referred to as an access node and/or base station. Exemplary access point 1100 includes a wireless receiver module 1102, a wireless transmitter module 1104, a processor 1106, a network J/O interface module 1108, and a memory 1110 coupled together via a bus 1112 over which the various elements may interchange data and information. Memory 1110 includes routines 1118 and data/information 1120. The processor 1106, e.g., a CPU, executes the routines 1118 and uses the data/information 1120 in memory 1110 to control the operation of the access point 1100 and implement methods, e.g., the method of flowchart 800 of FIG. 8.

Wireless receiver module 1102, e.g., an OFDM receiver, is coupled to receive antenna 1114 via which the access point 1100 receives uplink signals from access terminals. Received uplink signals include connection request messages and resource update request messages. Wireless receiver module 1102 receives a connection request from an access terminal with which access point 1100 has an active connection, said connection request including an identifier corresponding to a second access point with which said access terminal is seeking to establish an active connection. Received connection request 1138 is an example of a connection request received by wireless receiver module 1102. Exemplary received connection request 1138 includes an identifier 1140 used to identify the access point with which the access terminal is seeking to establish a new connection and a connection request message 1041. In some embodiments the received connection request 1138 includes resource information, e.g., resource information 1142 included as part of connection request message 1141 and/or resource information 1143 included with connection request message 1141. Resource information 1142 and/or resource information 1143 includes, e.g., information identifying resources, e.g., MAC resources, already assigned to the access terminal by the access point or points with which the access terminal has a current active connection, e.g., a set of access points including access point 1100.

Wireless transmitter module 1104, e.g., an OFDM transmitter, is coupled to transmit antenna 1116 via which the access point 1100 transmits downlink signals to access terminals. Downlink signals include forwarded connection response messages, e.g., a forwarded message corresponding to received connection response message 1144, and resource update response messages, e.g., generated resource update response message 1148.

In some embodiments multiple antennas and/or multiple antenna elements are used for reception. In some embodiments multiple antenna and/or multiple antenna elements are used for transmission. In some embodiments at least some of the same antennas or antenna elements are used for both transmission and reception. In some embodiments, the access point uses MIMO techniques.

Network I/O interface module 1108 couples the access point to other network nodes, e.g., other access points, and/or the Internet. Access point 1100 forwards at least a portion of a received connection request, to have an active connection with another access point, to the another access point via network I/O interface module 1108. Access point 1100 receives a connection response message from another access point via network lPO interface module 1108. Network I/O interface module 1108 receives from a second access point a connection response message, e.g., received connection response message 1144.

Routines 1118 include a communications routine 1122 and access point control routines 1124. The communications routine 1122 implements various communications protocols used by the access point, e.g., a layer 2 protocol, a MAC layer protocol, etc.

Access point control routines 1124 include a connection request forwarding module 1126, a connection response forwarding module 1128, a resource update request processing module 1130, a resource assignment module 1132, a resource update response message generation module 1134, and a tunneling module 1136. Data/information 1120 includes a received connection request 1138, a received connection response message 1144, a received resource update request message 1146, a generated resource update response message 1148, information identifying access terminals with active connection 1150, information identifying other access points 1152, tunnel information 1154 and resource allocation information 1156. Information identifying access terminals with active connection 1150 is a list of access terminals which currently have an active connection with access point 1100. Information identifying other access points 1152 includes information associating an identifier included in a connection request, e.g., identifier 1140, with a particular access point in the communications system. Such information 1152 is utilized by the connection request forwarding module 1126. Tunnel information 1154 includes, e.g., tunnel state information including, e.g., tunnel identification information and addressing information associated with tunnel end points. Resource allocation information 1156 includes information identifying resources, e.g., MAC resources, allocated by access point 1100 to access terminals.

Connection request forwarding module 1126 forwards at least a portion of a connection request to a second access point. In some embodiments, the forwarded potion of the connection request includes a connection request message and the forwarding of the portion of the connection request includes using an identifier corresponding to the second access point to determine the destination of the forwarded connection request message. In various embodiments, information indicating resources assigned by said access point 1100 to said access terminal is communicated to said second access point, e.g., as part of the forwarded portion of the connection request or in addition to the forwarded portion of the connection request. In some such embodiments, information indicating resources assigned by access point 1100 is included in the connection request received from the access terminal, e.g., as part of the connection request message or in addition to the connection request message. In some other embodiments, the information indicating resources assigned by access point 1100 to the access terminal is communicated with the forwarded portion of the connection request and is provided by access point 1100.

The forwarded connection request message, in some embodiments, includes one of an access terminal identifier and an access terminal address corresponding to the access terminal which initiated the request.

Connection response forwarding module 1128 forwards a received connection response message to an access terminal. The received connection response is, e.g., received from the second access point to which the connection request was directed.

In some embodiments, said portion of connection request is in the form of a message and the forwarding is performed using Layer 2 Transport Tunneling to forward the connection request message to a second access node. Tunneling module 1136 controls tunnel operations, e.g., tunnel establishment, tunnel usage and/or tunnel dissolution. In various embodiments, a connection response message is received via a Layer 2 Transport Tunnel between access point 1100 and a second access point. In some embodiments, during at least some times, both the connection request portion and the connection response are tunneled between access points.

The connection response message, in some embodiments, includes MAC resources assigned to an access terminal by a second access point. In some such embodiments, the assigned MAC resources include at least one control channel resource.

In various embodiments, the wireless receiver module 1102 receives a resource request update request message from an access terminal requesting a change of resources assigned to the access terminal by the access point 1 100. The resource update request processing module 1130 processes a received resource update request message, e.g., received resource update request message 1146. Resource assignment module 1132, which is responsive to the resource update request processing module 1 130, assigns resources to an access terminal. In various embodiments, the resource assignment module 1132 assigns new resources to the access terminal which are consistent with resources assigned by the second access point to the access terminal. Resource update response message generation module 1134 generates a resource update response message 1148 which is transmitted by wireless transmitter module 1104. The generated resource update response message 1148 includes, e.g., new resources which have been assigned by resource assignment module 1132 of access point 1100 to the access terminal.

Figure 12:
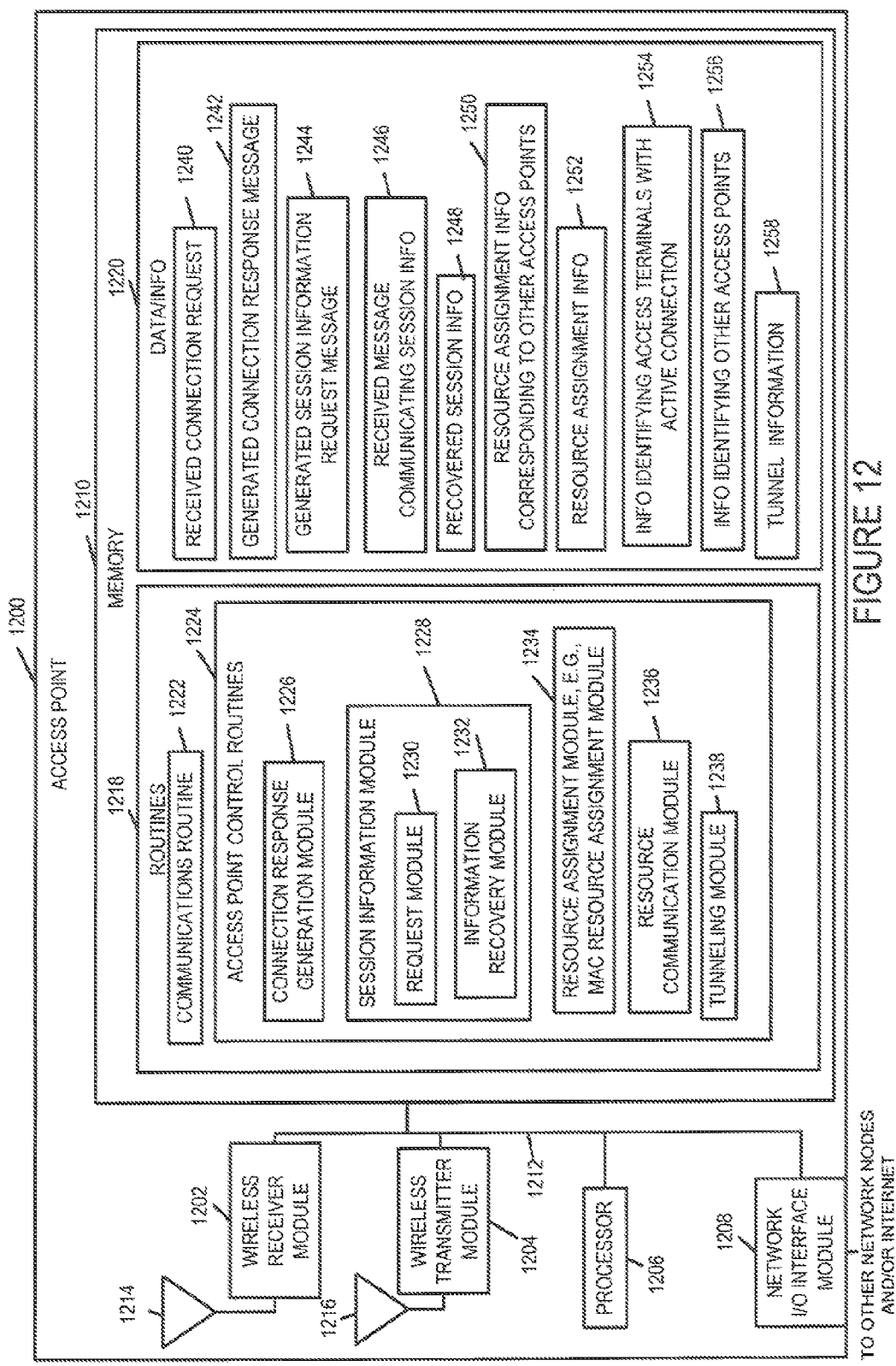
FIG. 12 is a drawing of an exemplary access point, e.g., a second access point, in accordance with various embodiments.

FIG. 12 is a drawing of an exemplary access point 1200 in accordance with various embodiments. Access point 1200 is, e.g., new access point b 606 of FIG. 6. Access point 1200 is sometimes referred to as an access node and/or base station. Exemplary access point 1200 includes a wireless receiver module 1202, a wireless transmitter module 1204, a processor 1206, a network I/O interface module 1208, and a memory 1210 coupled together via a bus 1212 over which the various elements may interchange data and information. Memory 1210 includes routines 1218 and data/information 1220. The processor 1206, e.g., a CPU, executes the routines 1218 and uses the data/information 1220 in memory 1210 to control the operation of the access point 1200 and implement methods, e.g., the method of flowchart 900 of FIG. 9.

Wireless receiver module 1202, e.g., an OFDM receiver, is coupled to receive antenna 1214 via which the access point 1200 receives uplink signals from access terminals. Wireless transmitter module 1204, e.g., an OFDM transmitter, is coupled to transmit antenna 1216 via which the access point 1200 transmits downlink signals to access terminals.

Network I/O interface module 1208 couples the access point 1200 to other network nodes, e.g., other access points, and/or the Internet. Network I/O interface module 1208 receives a connection request, e.g., received connection request 1240, communicated from another access point, e.g., access point 1100, to access point 1200 indicating that an access terminal is seeking to establish a connection with access point 1200. In various embodiments, the connection request includes one of: an access terminal identifier and an address corresponding to a device holding session information for a communications session in which the access terminal is involved. Network I/O interface module 1208 also communicates a connection response, e.g., generated connection response message 1242, to the another access point for forwarding to the access terminal which is seeking the connection. Network I/O interface module 1208 also transmits a generated session information request message, e.g., message 1244, directed to a device holding session information corresponding to the access terminal seeking connection, and network lPO interface module 1208 receives a message communication session information, e.g., message 1246 in response to the session information request.

Routines 1218 include a communications routine 1222 and access point control routines 1224. The communications routine 1222 implements various communications protocols used by the access point, e.g., a layer 2 protocol, a MAC layer protocol, etc.

Access point control routines 1224 include a connection response generation module 1226, a session information module 1228, a resource assignment module 1234, a resource communication module 1236 and a tunneling module 1238. Data/information 1220 includes a received connection request 1240, a generated connection response message 1242, a generated session information request message 1244, a received message communicating session information 1246, recovered session information 1248, resource assignment information corresponding to other access points 1250, resource assignment information 1252, information identifying access terminal with active connection 1254, information identifying other access points 1256, and tunnel information 1258. Information identifying access terminals with active connection 1254 is a list of access terminals which currently have an active connection with access point 1200. Information identifying other access points 1256 includes information associating an identifier with a particular access point in the communications system. Tunnel information 1258 includes, e.g., tunnel state information including, e.g., tunnel identification information and addressing information associated with tunnel end points.

Connection response generation module 1226 generates a connection response message, e.g., generated connection response message 1242.

Session information module 1228 retrieves session information for a communications session in which the access terminal is involved. Session information module 1228 includes a request module 1230 and an information recovery module 1232. Request module 1230 requests session information from a device holding session information for a communications session in which the access terminal is involved. In various embodiments, the device holding the session information is also an access point, e.g., an access point which may be and sometimes is different from the access point which received a connection request from the access terminal over an airlink and forwarded the connection request to access point 1200. Generated session information request message 1244 represents an exemplary output of request module 1230 directed to the device holding session information for the access terminal. Information recovery module 1232 receives and recovers session information from the device holding session information for the access terminal. Received message communicating session information 1246 is an input to information recovery module 1232 while recovered session information 1248 is an output of module 1232.

Resource assignment module 1234, e.g., a MAC resource assignment module, assigns resources, e.g., MAC resources, for the access terminal at access point 1200 which are consistent with resources, e.g., MAC resources, currently assigned to the access terminal with respect to an access point with which the access terminal has a connection, e.g., access point 1 100. Resource assignment information 1252 represents an output of resource assignment module 1234. In some embodiments, resources assigned to other access terminals by another access point or points, e.g., access point 1100, is received in the connection request message from the other point, e.g., received connection request 1240. Resource assignment information corresponding to other access points 1250 represents such recovered information communicated in received connection request 1240. In some embodiments, the resource assignment module 1234 assigns resources such that a control channel assigned at access point 1200 is of the same type as a control channel assigned at another access point, e.g., access point 1100. In various embodiments, the resource assignment module 1234 assigns resources such that the amount of control channel resources assigned to the access terminal at the first and second access points is the same or substantially the same.

Resource communication module 1236 communicates information about the assigned resources to the access terminal by sending a message through another access point, e.g., access point 1100, to the access terminal. In various embodiments, the resource assignment information is included as part of the generated connection response message. In some embodiments, communicating information includes sending the message to the another access point, e.g., access point 1100 in a Layer 2 tunnel between access point 1200 and the another access point, e.g., access point 1100. Tunneling module 1238 controls tunnel operations, e.g., tunnel establishment, tunnel usage and/or tunnel dissolution.

In various embodiments, an access point includes both features described with respect to access point 1100 of FIG. 11 and features described with respect to access point 1200 of FIG. 12. For example, an access point can be, and sometimes is, acting as a current serving access point for a first access terminal and is acting as an intermediary relaying a connection request to a new access terminal with which the first access terminal is seeking to establish a new connection. Concurrently, or at a different time, the same access point may be acting as a new access point with respect to a second access terminal.

In various embodiments nodes described herein are implemented using one or more modules to perform the steps corresponding to one or more methods, for example, signal processing, message generation and/or transmission steps. Some exemplary steps include transmitting a connection request, receiving a connection response, updating a set of information indicating access points with which an access terminal has an active connection, forwarding a connection request, forwarding a connection response, determining resource assignment, requesting resources, updating resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed:

1. A method for connecting an access terminal to a network, the method comprising:
    transmitting a connection request to a first access point with which said access terminal has a connection, said connection request includes a connection request message and an identifier of a second access point with which said access terminal seeks to establish an active connection;
    receiving a connection response message from said first access point, said connection response message includes information about control channel resources assigned by said second access point to the access terminal, wherein the assigned control channel resources include at least one of a control channel size and a control channel parameter;
    connecting said access terminal with the second access point using the assigned control channel resources provided in the connection response message; and
    updating, based on the received connection response message, a set of information maintained by said access terminal indicating access points with which said access terminal has active connections.

2. The method of claim 1, wherein the connection request message is directed through said first access point to the second access point identified by said identifier.

3. The method of claim 1, further comprising:
    prior to transmitting the connection request, generating said connection request message destined for delivery to said second access point.

4. The method of claim 1, wherein said connection request further includes resource information indicating resources assigned by said first access point to said access terminal.

5. The method of claim 1, further comprising:
    prior to transmitting the connection request, determining that a signal from the second access point is above a predetermined threshold.

6. The method of claim 1, wherein said connection request further includes a list of MAC resources currently assigned to said access terminal by multiple different access points which have an active connection with said access terminal.

7. The method of claim 1, wherein updating the set of information includes:
    including in said set of information maintained by said access terminal information indicating the resources assigned to the access terminal by the second access point.

8. The method of claim 7, further comprising:
    sending a resource update request message to request a change of the resources assigned by the first access point.

9. The method of claim 8, further comprising:
    prior to sending the resource update request message, determining if resources assigned to the access terminal by the second access point are not consistent with resources assigned to the access terminal assigned by the first access point; and
    wherein said step of sending the resource update request message is in response to determining that resources assigned to the access terminal by the second access point are not consistent with resources assigned to the access terminal by the first access point.

10. The method of claim 8, further comprising:
    receiving a response to said resource update request message indicating new resources which have been assigned by said first access point to said access terminal.

11. The method of claim 1, wherein said set of information indicating the access points with which said access terminal has the active connections is an active connection information set stored in said access terminal, said active connection information set includes a full list of access points with which said access terminal has an active connection, said full list being maintained only in said access terminal.

12. The method of claim 11, wherein said active connection information set includes information corresponding to resources assigned to said access terminal by different access points, said active connection information set including the information on said assigned resources is stored only in said access terminal.

13. An access terminal for use in a network, the access terminal comprising:
    a wireless transmitter module for transmitting a connection request to a first access point with which said access terminal has a connection, said connection request includes a connection request message and an identifier of a second access point with which said access terminal seeks to establish an active connection;
    a wireless receiver module for receiving a connection response message from said first access point, said connection response message includes information about control channel resources assigned by said second access point to the access terminal, wherein the assigned control channel resources include at least one of a control channel size and a control channel parameter;
    a connection module for connecting said access terminal with the second access point using the assigned control channel resources provided in the connection response message;
    memory including a set of information indicating access points with which said access terminal has active connections; and
    a connection management module for updating, based on the received connection response message, said set of information indicating the access points with which said access terminal has the active connections.

14. The access terminal of claim 13, wherein said connection request message is directed through said first access point to the second access point identified by said identifier.

15. The access terminal of claim 13 further comprising:
    a connection request message generation module for generating a connection request message destined to said second access point.

16. The access terminal of claim 13, wherein said connection request transmitted to said first access point further includes resource information indicating resources assigned by said first access point to said access terminal.

17. The access terminal of claim 13, further comprising:
    a power measurement module for determining that a signal from the second access point is above a predetermined threshold.

18. The access terminal of claim 13, wherein said connection request further includes a list of MAC resources currently assigned to said access terminal.

19. The access terminal of claim 13, wherein said set of information stored in said connection management module includes information indicating the resources assigned to the access terminal by the second access point.

20. The access terminal of claim 19, wherein said wireless transmitter module sends a resource update request message to request a change of resources assigned by the first access point.

21. The access terminal of claim 20, further comprising:
an assignment evaluation module for determining if resources assigned to the access terminal by the second access point are not consistent with the resources assigned to the access terminal by the first access point; and
a resource update request message control module for controlling sending of the resource update request message in response to said assignment evaluation module determining that the resources assigned to the access terminal by the second access point are not consistent with the resources assigned to the access terminal by the first access point.

22. The access terminal of claim 20, wherein said wireless receiver module also receives a response to said resource update request message indicating new resources which have been assigned by said first access point to said access terminal.

23. The access terminal of claim 22, wherein said connection management module updates said set of information to indicate the new resources assigned by the first access point of the access terminal.

24. The access terminal of claim 13, wherein said set of information indicating the access points with which said access terminal has the active connections is an active connection information set in said access terminal, said active connection information set includes a full list of access points with which said access terminal has an active connection, said full list being maintained in said access terminal and not at any other location in said network.

25. The access terminal of claim 24, wherein said active connection information set includes information corresponding to resources assigned to said access terminal by different access points, said active connection information set including the information on assigned resources is stored only in said access terminal.

26. An access terminal for use in a network, the access terminal comprising:
wireless transmitter means for transmitting a connection request to a first access point with which said access terminal has a connection, said connection request includes a connection request message and an identifier of a second access point with which said access terminal seeks to establish an active connection;
means for receiving a connection response message from said first access point, said connection response message includes information about control channel resources assigned by said second access point to the access terminal, wherein the assigned control channel resources include at least one of a control channel size and a control channel parameter;
means for connecting said access terminal with the second access point using the assigned control channel resources provided in the connection response message;
memory means including a set of information indicating access points with which said access terminal has active connections; and
means for updating, based on the received connection response message, said set of information indicating the access points with which said access terminal has active connections.

27. The access terminal of claim 26, wherein said set of information stored in said means for updating includes information indicating the resources assigned to the access terminal by the second access point.

28. The access terminal of claim 27, wherein said set of information indicating access points with which said access terminal has the active connections is an active connection information set stored in said access terminal, said active connection information set includes a full list of access points with which said access terminal has the active connection, said full list being maintained only in said access terminal.

29. The access terminal of claim 28, wherein said active connection information set includes information corresponding to resources assigned to said access terminal by different access points, said active connection information set including the information on the assigned resources is stored only in said access terminal.

30. The access terminal of claim 29, wherein said wireless transmitter means sends a resource update request message to request a change of the resources assigned by the first access point.

31. An apparatus comprising:
a processor for use in an access terminal, the processor configured to:
transmit a connection request to a first access point with which said access terminal has a connection, said connection request includes a connection request message and an identifier of a second access point with which said access terminal seeks to establish an active connection;
receive a connection response message from said first access point, said connection response message includes information about control channel resources assigned by said second access point to the access terminal, wherein the assigned control channel resources include at least one of a control channel size and a control channel parameter;
connect the access terminal with the second access point using the assigned control channel resources provided in the connection response message; and
update, based on the received connection response message, a set of information maintained by said access terminal indicating access points with which said access terminal has active connections.

32. The apparatus of claim 31, wherein the processor is further configured to, while updating the set of information: include in said set of information an information indicating the resources assigned to the access terminal by the second access point.

33. The apparatus of claim 32, wherein said set of information indicating access points with which said access terminal has an active connection is an active connection information set stored in said access terminal, said active connection information set includes a full list of access points with which said access terminal has an active connection, said full list being maintained only in said access terminal.

34. The apparatus of claim 33, wherein said active connection information set includes information corresponding to resources assigned to said access terminal by different access points, said active connection information set including the information on assigned resources is stored only in said access terminal.

35. The apparatus of claim 34, wherein said processor is further configured to:
send a resource update request message to request a change of the resources assigned by the first access point.

36. A non-transitory computer readable medium embodying machine executable instructions which, when executed by a processor comprised in an access terminal cause the processor to implement a method for connecting said access terminal with other communications devices, the method comprising:
transmitting a connection request to a first access point with which said access terminal has a connection, said connection request includes a connection request message and an identifier of a second access point with which said access terminal seeks to establish an active connection;
receiving a connection response message from said first access point, said connection response message includes information about control channel resources assigned by said second access point to the access terminal, wherein the assigned control channel resources include at least one of a control channel size and a control channel parameter;
connecting said access terminal with the second access point using the assigned control channel resources provided in the connection response message; and
updating, based on the received connection response message, a set of information maintained by said access terminal indicating access points with which said access terminal has the active connections.

37. The non-transitory computer readable medium of claim 36, wherein said updating the set of information includes: including in said set of information an information indicating the resources assigned to the access terminal by the second access point.

38. The non-transitory computer readable medium of claim 37, wherein said set of information indicating the access points with which said access terminal has the active connection is an active connection information set stored in said access terminal, said active connection information set includes a full list of access points with which said access terminal has the active connection, said full list being maintained only in said access terminal.

39. The non-transitory computer readable medium of claim 38, wherein said active connection information set includes information corresponding to resources assigned to said access terminal by different access points, said active connection information set including the information on assigned resources is stored only in said access terminal.

40. The non-transitory computer readable medium of claim 39, further embodying machine executable instructions for:
sending a resource update request message to request a change of resources assigned by the first access point.

* * * * *